US012701631B2

(12) United States Patent
Park et al.

(10) Patent No.: US 12,701,631 B2
(45) Date of Patent: Aug. 4, 2026

(54) METHOD AND DEVICE FOR TRANSMITTING OR RECEIVING INFORMATION RELATING TO SL DRX ACTIVE TIME IN NR V2X

(71) Applicant: LG ELECTRONICS INC., Seoul (KR)

(72) Inventors: Giwon Park, Seoul (KR); Hanbyul Seo, Seoul (KR); Seoyoung Back, Seoul (KR); Jongwoo Hong, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 331 days.

(21) Appl. No.: 18/287,436

(22) PCT Filed: Apr. 21, 2022

(86) PCT No.: PCT/KR2022/005732
§ 371 (c)(1),
(2) Date: Oct. 18, 2023

(87) PCT Pub. No.: WO2022/225352
PCT Pub. Date: Oct. 27, 2022

(65) Prior Publication Data
US 2024/0206008 A1 Jun. 20, 2024

Related U.S. Application Data

(60) Provisional application No. 63/229,564, filed on Aug. 5, 2021, provisional application No. 63/178,490, filed on Apr. 22, 2021.

(51) Int. Cl.
*H04W 76/28* (2018.01)
*H04W 72/02* (2009.01)
(Continued)

(52) U.S. Cl.
CPC ........... *H04W 76/28* (2018.02); *H04W 72/02* (2013.01); *H04W 72/0446* (2013.01); *H04W 72/25* (2023.01); *H04W 92/18* (2013.01)

(58) Field of Classification Search
CPC . H04W 92/18; H04W 72/0446; H04W 72/02; H04W 72/25; H04W 76/28
(Continued)

(56) References Cited

U.S. PATENT DOCUMENTS

2022/0110055 A1* 4/2022 Hosseini ........... H04W 52/0229
2023/0039782 A1* 2/2023 Sarkis ................... H04W 72/25
2023/0403681 A1 12/2023 Wen et al.

FOREIGN PATENT DOCUMENTS

CN 112272397 1/2021
KR 1020200093517 8/2020

OTHER PUBLICATIONS

PCT International Application No. PCT/KR2022/005732, International Search Report dated Aug. 2, 2022, 3 pages.
(Continued)

*Primary Examiner* — Peter G Solinsky
(74) *Attorney, Agent, or Firm* — LEE, HONG, DEGERMAN, KANG & WAIMEY

(57) ABSTRACT

A method for performing wireless communication by a first device and a device supporting same are proposed. The method comprises the steps of: obtaining a sidelink (SL) discontinuous reception (DRX) configuration including information related to an active time of a second device; initiating resource selection in a first slot; and determining a selection window on the basis of the first slot. For example, the first device may transmit, to the second device, information for extension of the active time of the second device through a physical sidelink control channel (PSCCH) or a physical sidelink shared channel (PSSCH) related to the
(Continued)

PSCCH on the basis that the number of SL resources in the time domain of the selection window is smaller than a threshold.

14 Claims, 17 Drawing Sheets

(51) Int. Cl.
| | | |
|---|---|---|
| *H04W 72/0446* | (2023.01) | |
| *H04W 72/25* | (2023.01) | |
| *H04W 92/18* | (2009.01) | |

(58) Field of Classification Search
USPC .......................................................... 370/329
See application file for complete search history.

(56) References Cited

OTHER PUBLICATIONS

LG Electronics, "Discussion on physical layer design considering sidelink DRX operation," 3GPP TSG RAN WG1 #103-e, R1-2007897, Nov. 2020, 15 pages.
Vivo, "Resource allocation for sidelink power saving," 3GPP TSG RAN WG1 #104b-e, R1-2102539, Apr. 2021, 21 pages.
InterDigital Inc., "Sidelink resource allocation for power saving," 3GPP TSG RAN WG1 #104-e, R1-2103537, Apr. 2021, 8 pages.
Qualcomm Incorporated, "Power Savings for Sidelink," 3GPP TSG RAN WG1 Meeting #104bis-e, R1-2103184, Apr. 2021, 13 pages.
1 European Patent Office Application Serial No. 22792050.1, Search Report dated Mar. 12, 2025, 10 pages.

* cited by examiner

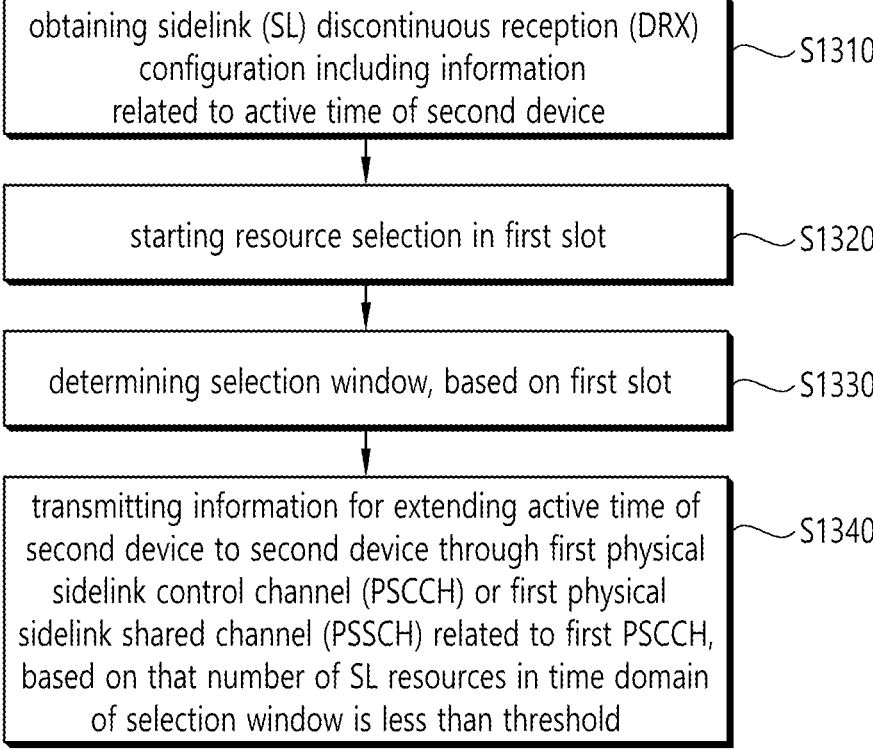

obtaining sidelink (SL) discontinuous reception (DRX) configuration including information related to active time of second device ⟶ S1310 starting resource selection in first slot ⟶ S1320 determining selection window, based on first slot ⟶ S1330 transmitting information for extending active time of second device to second device through first physical sidelink control channel (PSCCH) or first physical sidelink shared channel (PSSCH) related to first PSCCH, based on that number of SL resources in time domain of selection window is less than threshold ⟶ S1340

FIG. 14

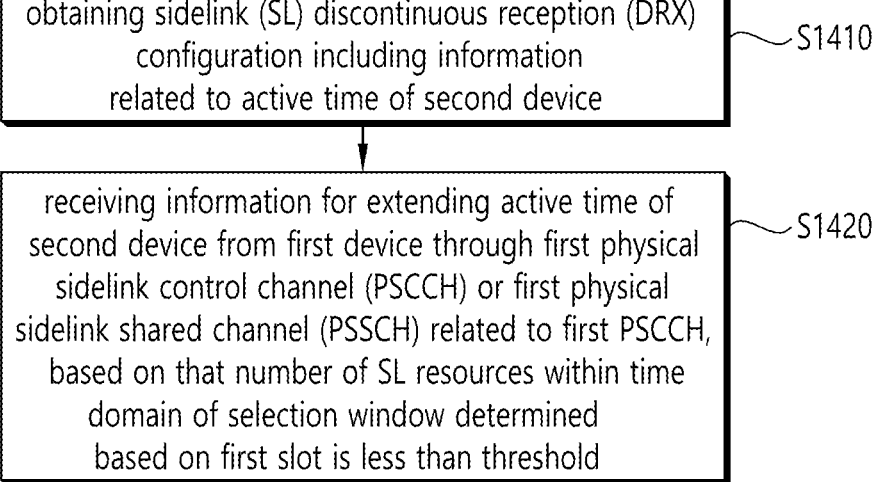

obtaining sidelink (SL) discontinuous reception (DRX) configuration including information related to active time of second device ⟶ S1410 receiving information for extending active time of second device from first device through first physical sidelink control channel (PSCCH) or first physical sidelink shared channel (PSSCH) related to first PSCCH, based on that number of SL resources within time domain of selection window determined based on first slot is less than threshold ⟶ S1420

FIG. 18

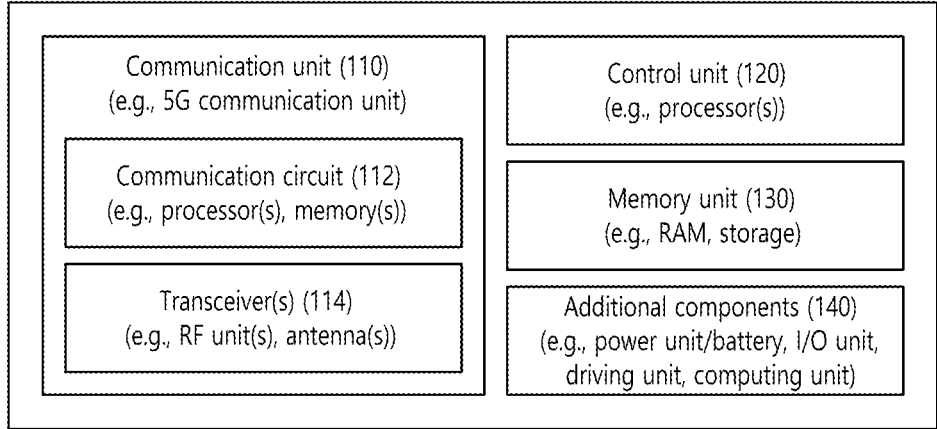

Device (100,200)

Communication unit (110)
(e.g., 5G communication unit)

Communication circuit (112)
(e.g., processor(s), memory(s))

Transceiver(s) (114)
(e.g., RF unit(s), antenna(s))

Control unit (120)
(e.g., processor(s))

Memory unit (130)
(e.g., RAM, storage)

Additional components (140)
(e.g., power unit/battery, I/O unit,
driving unit, computing unit)

FIG. 19

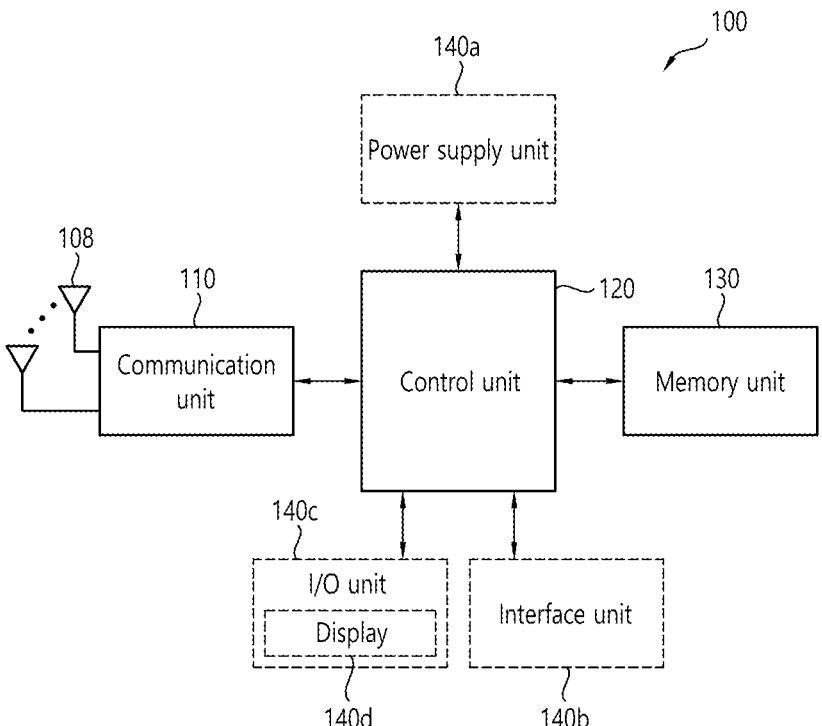

100

140a

Power supply unit

108

110

Communication
unit

120

Control unit

130

Memory unit

140c

I/O unit

Display

140d

Interface unit

140b

METHOD AND DEVICE FOR TRANSMITTING OR RECEIVING INFORMATION RELATING TO SL DRX ACTIVE TIME IN NR V2X

CROSS-REFERENCE TO RELATED APPLICATION(S)

This application is the National Stage filing under 35 U.S.C. 371 of International Application No. PCT/KR2022/ 005732, filed on Apr. 21, 2022, which claims the benefit of U.S. Provisional Application No(s). 63/178,490, filed on Apr. 22, 2021, and 63/229,564, filed on Aug. 5, 2021, the contents of which are all incorporated by reference herein in their entirety.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

Meanwhile, for example, the number of sidelink (SL) resources remaining in a time domain of a selection window may be less than the number of SL resources to be used in transmission of data to be transmitted by a transmitting (TX) user equipment (UE) to a receiving (RX) UE. In this case, for example, the TX UE may transmit, to the RX UE, information on an additional available SL resource within a time after the time domain of the selection window. However, for example, the RX UE may wake up at a position of a next transmission resource based on reservation transmission resource information included in sidelink control information (SCI) transmitted by the TX UE to the RX UE to monitor/receive a physical sidelink control channel (PSCCH)/physical sidelink shared channel (PSSCH) to be transmitted by the TX UE. Therefore, for example, the RX UE may not be able to receive the information outside an active time of the RX UE. For example, the SL resource transmitted by the TX UE to the RX UE may be wasted.

In an embodiment, a method in which a first device performs wireless communication is provided. The method may include: obtaining a sidelink (SL) discontinuous reception (DRX) configuration including information related to an active time of a second device; starting resource selection in a first slot; and determining a selection window, based on the first slot. For example, the method may include transmitting, by the first device, information for extending the active time of the second device to the second device through a first physical sidelink control channel (PSCCH) or a first physical sidelink shared channel (PSSCH) related to the first PSCCH, based on that the number of SL resources in a time domain of the selection window is less than a threshold.

In an embodiment, a first device performing wireless communication is provided. The first device may include: one or more memories storing instructions: one or more transceivers: and one or more processors coupling the one or more memories and the one or more transceivers. The one or more processors may execute the instructions to: obtain an SL DRX configuration including information related to an active time of a second device: start resource selection in a first slot; determine a selection window, based on the first slot: and transmit information for extending the active time of the second device to the second device through a first PSCCH or a first PSSCH related to the first PSCCH, based on that the number of SL resources in a time domain of the selection window is less than a threshold.

In an embodiment, an apparatus configured to control a first user equipment (UE) is provided. The apparatus may include one or more processors; and one or more memories operatively coupled by the one or more processors and storing instructions. The one or more processors may execute the instructions to: obtain an SL DRX configuration including information related to an active time of a second UE: start resource selection in a first slot; determine a selection window, based on the first slot; and transmit information for extending the active time of the second device to the second device through a first PSCCH or a first PSSCH related to the first PSCCH, based on that the number of SL resources in a time domain of the selection window is less than a threshold.

In an embodiment, a non-transitory computer-readable medium having instructions recorded thereon is proposed. The instructions, when executed by one or more processors, may cause the one or more processors to: cause a first device to obtain an SL DRX configuration including information related to an active time of a second device, cause the first device to start resource selection in a first slot: cause the first device to determine a selection window, based on the first slot; and cause the first device to transmit information for extending the active time of the second device to the second device through a first PSCCH or a first PSSCH related to the first PSCCH, based on that the number of SL resources in a time domain of the selection window is less than a threshold.

In an embodiment, a method in which a second device performs wireless communication is proposed. The method may include: obtaining an SL DRX configuration including information related to an active time of a second device; and receiving information for extending the active time of the second device from a first device through a first PSCCH or a first PSSCH related to the first PSCCH, based on that the number of SL resources within the time domain of the selection window determined based on the first slot is less than a threshold.

In an embodiment, a second device performing wireless communication is provided. The second device may include: one or more memories storing instructions: one or more transceivers: and one or more processors coupling the one or more memories and the one or more transceivers. The one or more processors may execute the instructions to: obtain an SL DRX configuration including information related to an active time of the second device; and receive information for extending the active time of the second device from a first device through a first PSCCH or a first PSSCH related to the first PSCCH, based on that the number of SL resources within the time domain of the selection window determined based on the first slot is less than a threshold.

In an embodiment, an apparatus configured to control a second UE is provided. The apparatus may include: one or more processors; and one or more memories operatively coupled by the one or more processors and storing instructions. The one or more processors may execute the instructions to: obtain an SL DRX configuration including information related to an active time of the second UE; and receive information for extending the active time of the second device from a first device through a first PSCCH or a first PSSCH related to the first PSCCH, based on that the number of SL resources within the time domain of the selection window determined based on the first slot is less than a threshold.

In an embodiment, a non-transitory computer-readable medium having instructions recorded thereon is proposed. The instructions, when executed by one or more processors, may cause the one or more processors to: cause a second device to obtain an SL DRX configuration including information related to an active time of the second device; and cause the second device to receive information for extending the active time of the second device from a first device through a first PSCCH or a first PSSCH related to the first PSCCH, based on that the number of SL resources within the time domain of the selection window determined based on the first slot is less than a threshold.

A UE can efficiently perform sidelink communication.

BRIEF DESCRIPTION OF THE DRAWINGS

FIG. 2 shows a radio protocol architecture, based on an embodiment of the present disclosure.

FIG. 13 shows a method for a first device to perform wireless communication, according to an embodiment of the present disclosure.

FIG. 14 shows a method for a second device to perform wireless communication according to an embodiment of the present disclosure.

FIG. 18 shows another example of a wireless device, based on an embodiment of the present disclosure.

FIG. 19 shows a hand-held device, based on an embodiment of the present disclosure.

DETAILED DESCRIPTION

Figure 1:
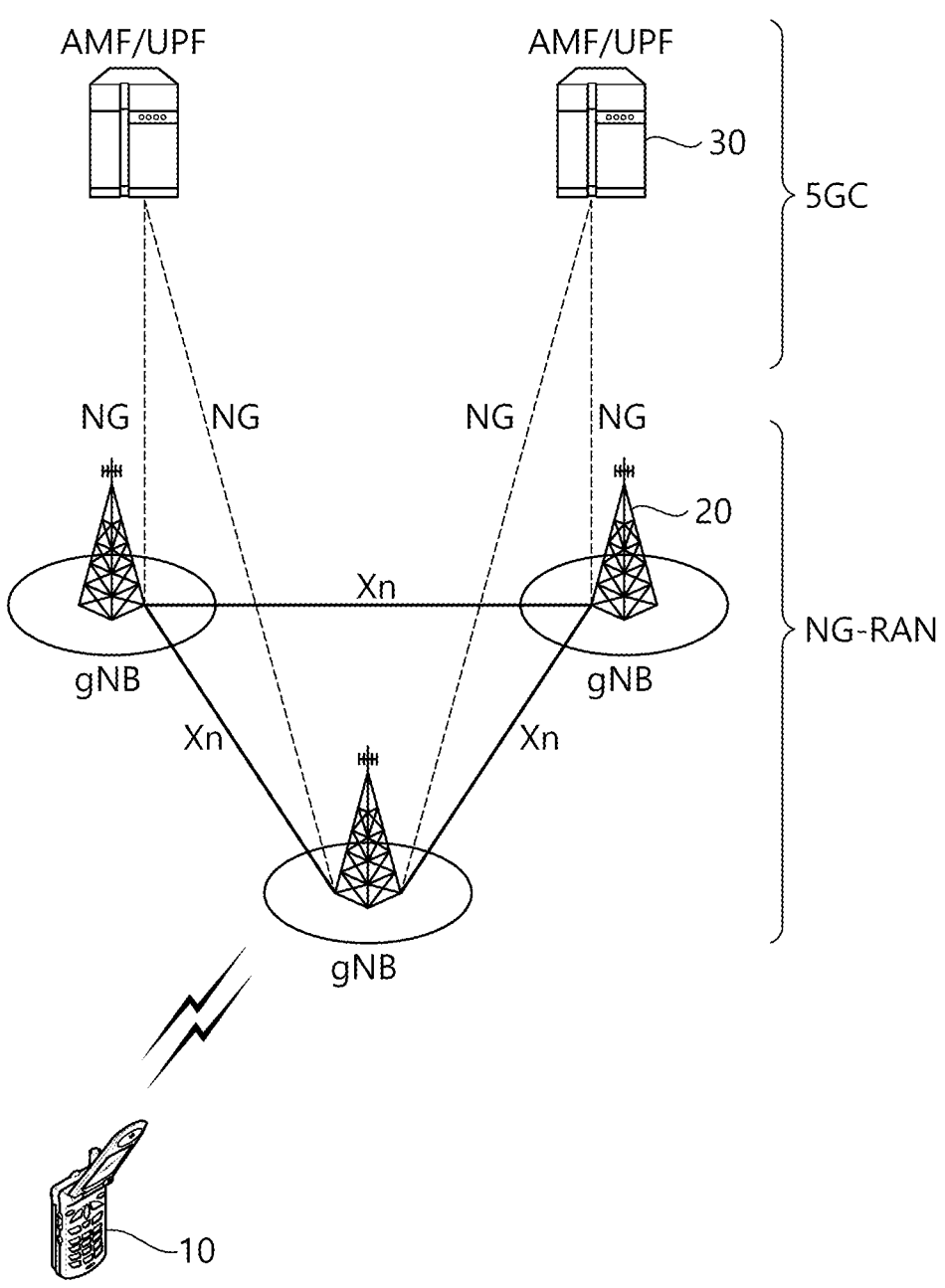
FIG. 1 shows a structure of an NR system, based on an embodiment of the present disclosure.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

In the following description, 'when, if', or in case of may be replaced with 'based on'.

A technical feature described individually in one figure in the present disclosure may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and pro-vides backward compatibility with a system based on the IEEE 802.16e. The UTRA is part of a universal mobile telecommunication system (UMTS). 3rd generation partner-ship project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A correspond-ing to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclo-sure will not be limited only to this.

FIG. 1 shows a structure of an NR system, based on an embodiment of the present disclosure. The embodiment of FIG. 1 may be combined with various embodiments of the present disclosure.

Referring to FIG. 1, a next generation-radio access net-work (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 1 exemplifies a case where only the gNB is included. The BSs 20 may be connected to one another via Xn interface. The BS 20 may be connected to one another via 5th generation (5G) core network (5GC) and NG interface. More specifically, the BSs 20 may be con-nected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system inter-connection (OSI) model that is well-known in the commu-nication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
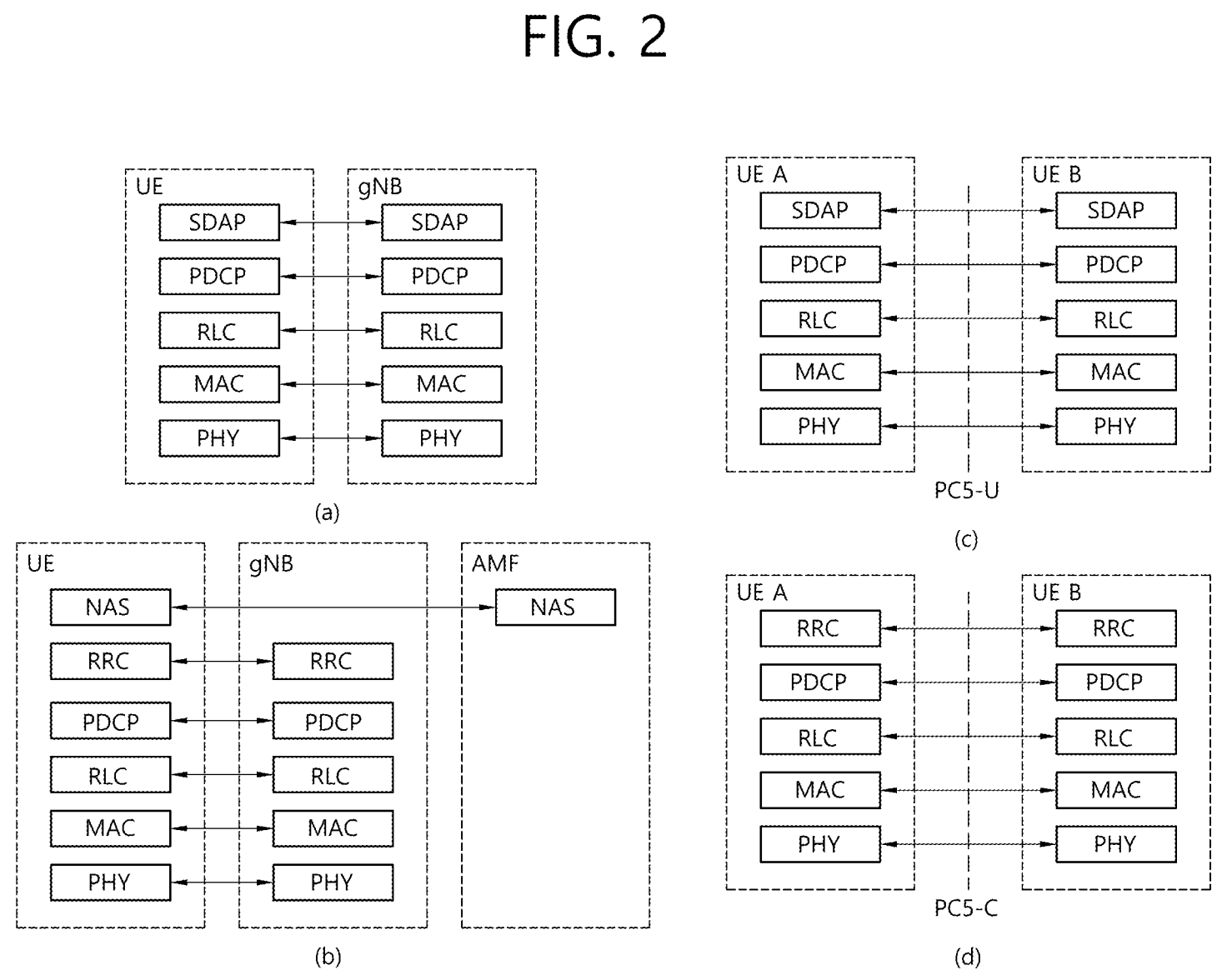

FIG. 2 shows a radio protocol architecture, based on an embodiment of the present disclosure. The embodiment of FIG. 2 may be combined with various embodiments of the present disclosure. Specifically, (a) of FIG. 2 shows a radio protocol stack of a user plane for Uu communication, and (b) of FIG. 2 shows a radio protocol stack of a control plane for Uu communication. (c) of FIG. 2 shows a radio protocol stack of a user plane for SL communication, and (d) of FIG. 2 shows a radio protocol stack of a control plane for SL communication.

Referring to FIG. 2, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified accord-ing to how and with what characteristics data is transmitted through a radio interface.

Between different physical layers, i.e., a physical layer of a transmitter and a physical layer of a receiver, data are transferred through the physical channel. The physical chan-nel is modulated using an orthogonal frequency division multiplexing (OFDM) scheme, and utilizes time and fre-quency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QOS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QOS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 3:
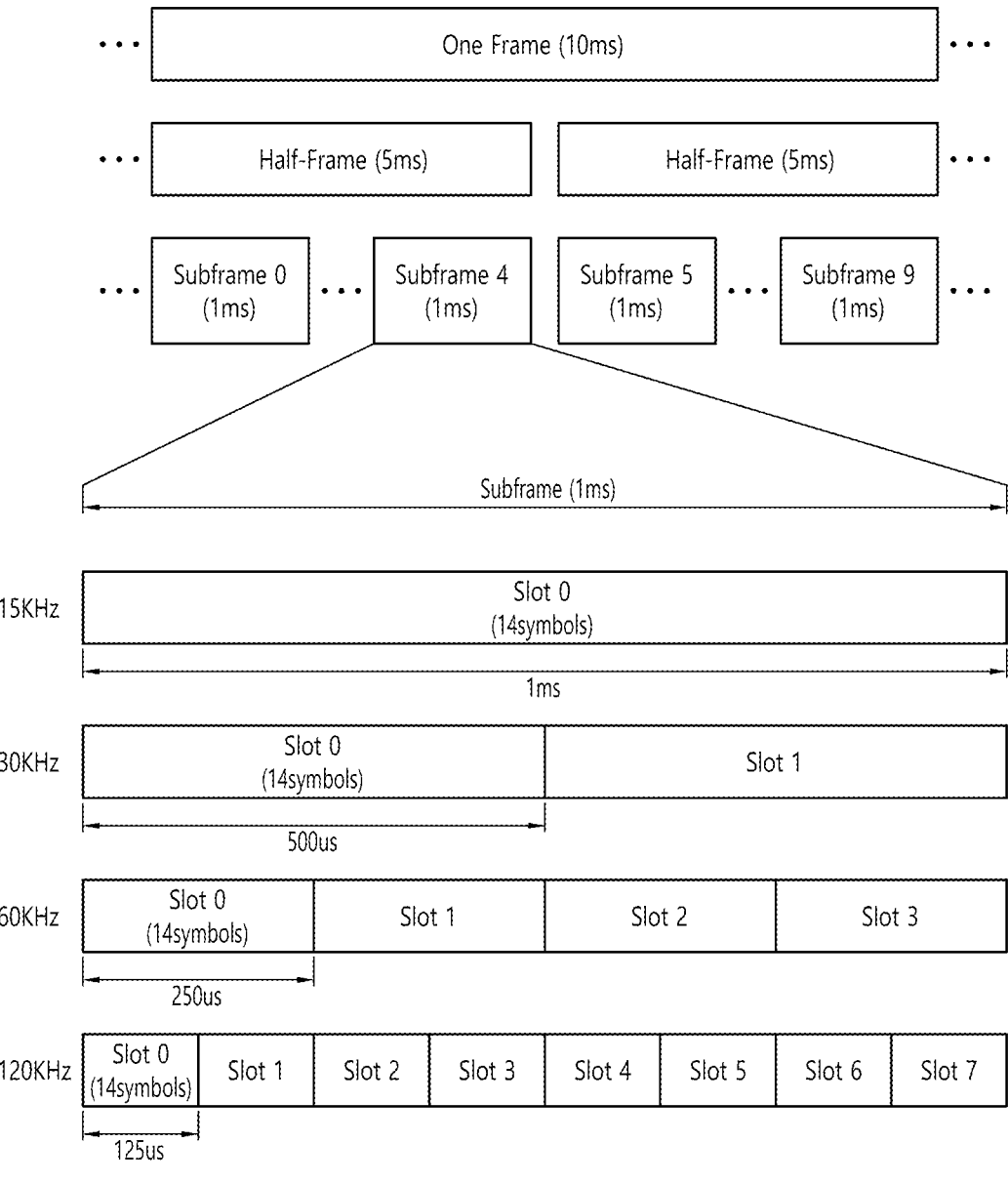
FIG. 3 shows a structure of a radio frame of an NR, based on an embodiment of the present disclosure.

FIG. 3 shows a structure of a radio frame of an NR, based on an embodiment of the present disclosure. The embodiment of FIG. 3 may be combined with various embodiments of the present disclosure.

Referring to FIG. 3, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame,\,u}_{slot}$ | $N^{subframe,\,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame,\,u}_{slot}$ | $N^{subframe,\,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells. In the NR, multiple numerologies or SCSs for supporting diverse 5G services may be supported. For example, in case an SCS is 15 kHz, a wide area of the conventional cellular bands may be supported, and, in case an SCS is 30 KHz/60 kHz a dense-urban, lower latency, wider carrier bandwidth may be supported. In case the SCS is 60 kHz or higher, a bandwidth that is greater than 24.25 GHZ may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 4:
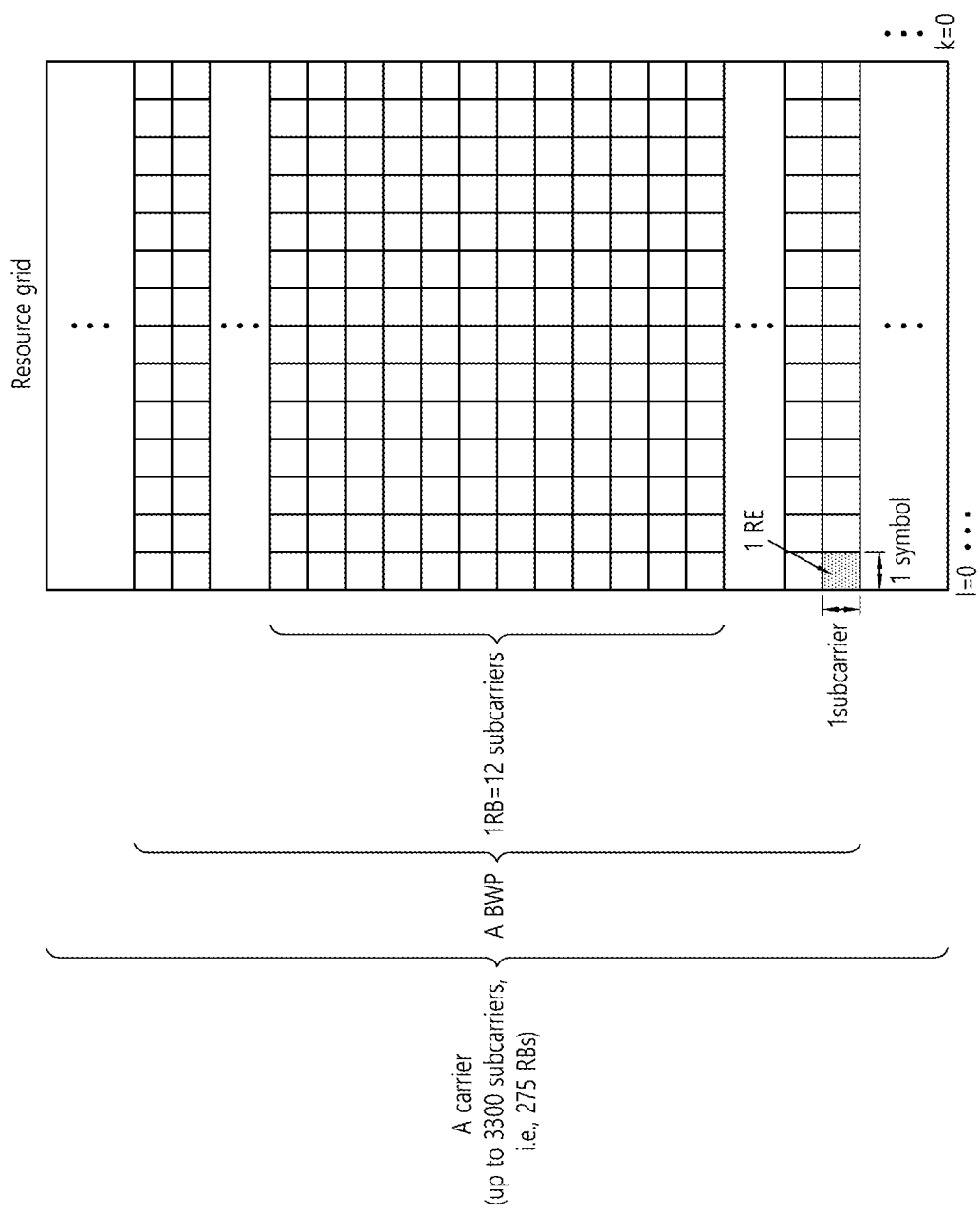
FIG. 4 shows a structure of a slot of an NR frame, based on an embodiment of the present disclosure.

FIG. 4 shows a structure of a slot of an NR frame, based on an embodiment of the present disclosure. The embodiment of FIG. 4 may be combined with various embodiments of the present disclosure. Referring to FIG. 4, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 5:
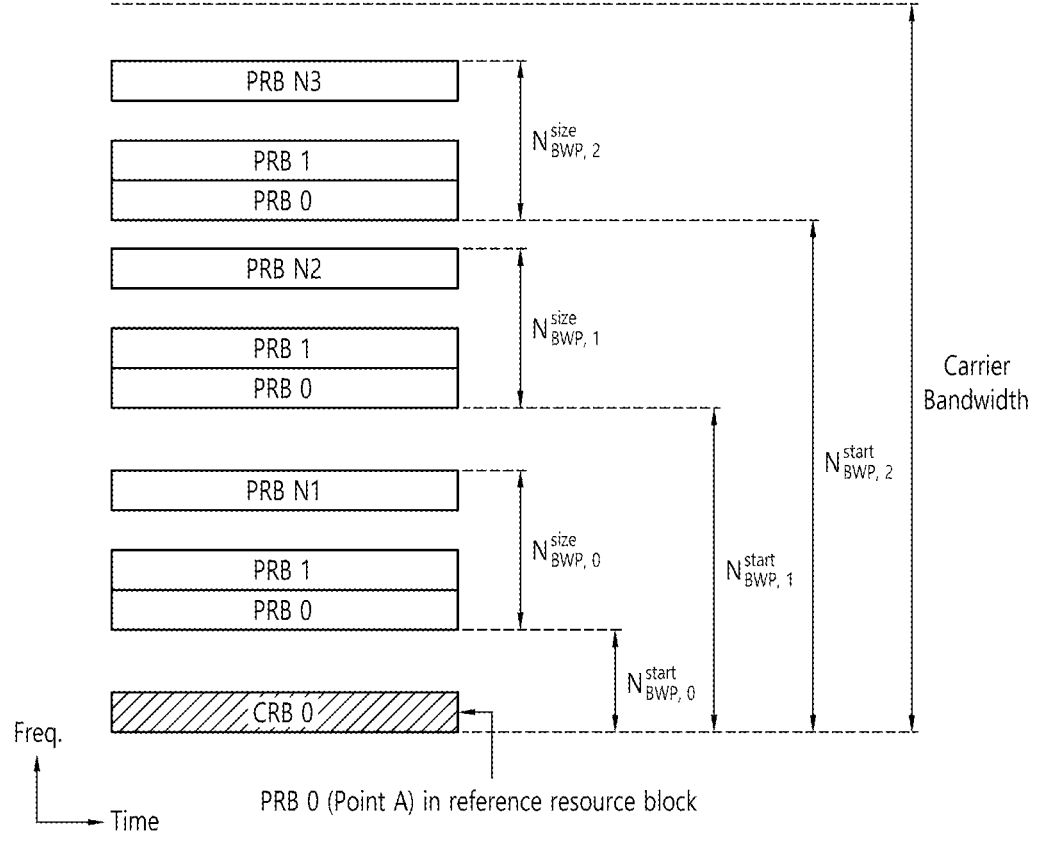
FIG. 5 shows an example of a BWP, based on an embodiment of the present disclosure.

FIG. 5 shows an example of a BWP, based on an embodiment of the present disclosure. The embodiment of FIG. 5 may be combined with various embodiments of the present disclosure. It is assumed in the embodiment of FIG. 5 that the number of BWPs is 3.

Referring to FIG. 5, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 6:
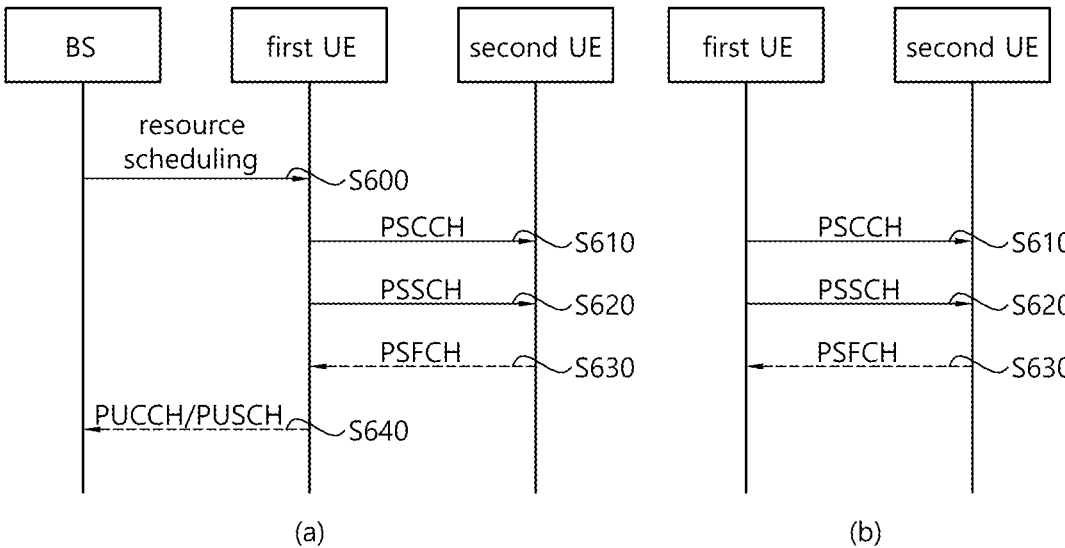
FIG. 6 shows a procedure of performing V2X or SL communication by a UE based on a transmission mode, based on an embodiment of the present disclosure.

FIG. 6 shows a procedure of performing V2X or SL communication by a UE based on a transmission mode, based on an embodiment of the present disclosure. The embodiment of FIG. 6 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 6 shows a UE operation related to an LTE transmission mode 1 or an LTE transmission mode 3. Alternatively, for example, (a) of FIG. 6 shows a UE operation related to an NR resource allocation mode 1. For example, the LTE transmission mode 1 may be applied to general SL communication, and the LTE transmission mode 3 may be applied to V2X communication.

For example, (b) of FIG. 6 shows a UE operation related to an LTE transmission mode 2 or an LTE transmission mode 4. Alternatively, for example, (b) of FIG. 6 shows a UE operation related to an NR resource allocation mode 2.

Referring to (a) of FIG. 6, in the LTE transmission mode 1, the LTE transmission mode 3, or the NR resource allocation mode 1, a base station may schedule SL resource(s) to be used by a UE for SL transmission. For example, in step S600, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

In step S610, the first UE may transmit a PSCCH (e.g., sidelink control information (SCI) or 1st-stage SCI) to a second UE based on the resource scheduling. In step S620, the first UE may transmit a PSSCH (e.g., 2nd-stage SCI, MAC PDU, data, etc.) related to the PSCCH to the second UE. In step S630, the first UE may receive a PSFCH related to the PSCCH/PSSCH from the second UE. For example, HARQ feedback information (e.g., NACK information or ACK information) may be received from the second UE through the PSFCH. In step S640, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1.

Referring to (b) of FIG. 6, in the LTE transmission mode 2, the LTE transmission mode 4, or the NR resource allocation mode 2, a UE may determine SL transmission resource(s) within SL resource(s) configured by a base station/network or pre-configured SL resource(s). For example, the configured SL resource(s) or the pre-configured SL resource(s) may be a resource pool. For example, the UE may autonomously select or schedule resource(s) for SL transmission. For example, the UE may perform SL communication by autonomously selecting resource(s) within the configured resource pool. For example, the UE may autonomously select resource(s) within a selection window by performing a sensing procedure and a resource (re)selection procedure. For example, the sensing may be performed in a unit of subchannel(s). For example, in step S610, a first UE which has selected resource(s) from a resource pool by itself may transmit a PSCCH (e.g., sidelink control information (SCI) or 1st-stage SCI) to a second UE by using the resource(s). In step S620, the first UE may transmit a PSSCH (e.g., 2nd-stage SCI, MAC PDU, data, etc.) related to the PSCCH to the second UE. In step S630, the first UE may receive a PSFCH related to the PSCCH/PSSCH from the second UE.

Referring to (a) or (b) of FIG. 6, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a first SCI, a 1st-stage SCI or a 1st-stage SCI format, and a SCI transmitted through a PSSCH may be referred to as a 2nd SCI, a second SCI, a 2nd-stage SCI or a 2nd-stage SCI format. For example, the 1st-stage SCI format may include a SCI format 1-A, and the 2nd-stage SCI format may include a SCI format 2-A and/or a SCI format 2-B.

Hereinafter, an example of SCI format 1-A will be described.

SCI format 1-A is used for the scheduling of PSSCH and 2nd-stage-SCI on PSSCH.

The following information is transmitted by means of the SCI format 1-A:

Priority—3 bits

Frequency resource assignment-ceiling $(\log_2 (N^{SL}_{subChannel}(N^{SL}_{subChannel}+1)/2))$ bits when the value of the higher layer parameter sl-MaxNumPerReserve is configured to 2; otherwise ceiling $\log_2(N^{SL}_{subChannel}(N^{SL}_{subChannel}+1)(2N^{SL}_{subChannel}+1)/6)$ bits when the value of the higher layer parameter sl-MaxNumPerReserve is configured to 3

Time resource assignment—5 bits when the value of the higher layer parameter sl-MaxNumPerReserve is configured to 2; otherwise 9 bits when the value of the higher layer parameter sl-MaxNumPerReserve is configured to 3

Resource reservation period—ceiling $(\log_2 N_{rsv\_period})$ bits, where $N_{rsv\_period}$ is the number of entries in the higher layer parameter sl-ResourceReservePeriodList, if higher layer parameter sl-MultiReserveResource is configured; 0 bit otherwise DMRS pattern—ceiling (log₂N$_{pattern}$) bits, where N$_{pattern}$ is the number of DMRS patterns configured by higher layer parameter sl-PSSCH-DMRS-TimePatternList 2$^{nd}$-stage SCI format—2 bits as defined in Table 5

Beta_offset indicator—2 bits as provided by higher layer parameter sl-BetaOffsets2ndSCI Number of DMRS port—1 bit as defined in Table 6

Modulation and coding scheme—5 bits

Additional MCS table indicator—1 bit if one MCS table is configured by higher layer parameter sl-Additional-MCS-Table; 2 bits if two MCS tables are configured by higher layer parameter sl-Additional-MCS-Table; 0 bit otherwise PSFCH overhead indication—1 bit if higher layer parameter sl-PSFCH-Period=2 or 4; 0 bit otherwise Reserved—a number of bits as determined by higher layer parameter sl-NumReservedBits, with value set to zero.

TABLE 5

| Value of 2nd-stage SCI format field | 2nd-stage SCI format |
| --- | --- |
| 00 | SCI format 2-A |
| 01 | SCI format 2-B |
| 10 | Reserved |
| 11 | Reserved |

TABLE 6

| Value of the Number of DMRS port field | Antenna ports |
| --- | --- |
| 0 | 1000 |
| 1 | 1000 and 1001 |

Hereinafter, an example of SCI format 2-A will be described. SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

HARQ process number—4 bits

New data indicator—1 bit

Redundancy version—2 bits

Source ID—8 bits

Destination ID—16 bits

HARQ feedback enabled/disabled indicator—1 bit

Cast type indicator—2 bits as defined in Table 7

CSI request—1 bit

TABLE 7

| Value of Cast type indicator | Cast type |
| --- | --- |
| 00 | Broadcast |
| 01 | Groupcast when HARQ-ACK information includes ACK or NACK |
| 10 | Unicast |
| 11 | Groupcast when HARQ-ACK information includes only NACK |

Hereinafter, an example of SCI format 2-B will be described. SCI format 2-B is used for the decoding of PSSCH, with HARQ operation when HARQ-ACK information includes only NACK, or when there is no feedback of HARQ-ACK information.

The following information is transmitted by means of the SCI format 2-B:

HARQ process number—4 bits

New data indicator—1 bit

Redundancy version—2 bits

Source ID—8 bits

Destination ID—16 bits

HARQ feedback enabled/disabled indicator—1 bit

Zone ID—12 bits

Communication range requirement—4 bits determined by higher layer parameter sl-ZoneConfigMCR-Index Referring to (a) or (b) of FIG. 6, in step S630, the first UE may receive the PSFCH. For example, the first UE and the second UE may determine a PSFCH resource, and the second UE may transmit HARQ feedback to the first UE using the PSFCH resource.

Referring to (a) of FIG. 6, in step S640, the first UE may transmit SL HARQ feedback to the base station through the PUCCH and/or the PUSCH.

Figure 7:
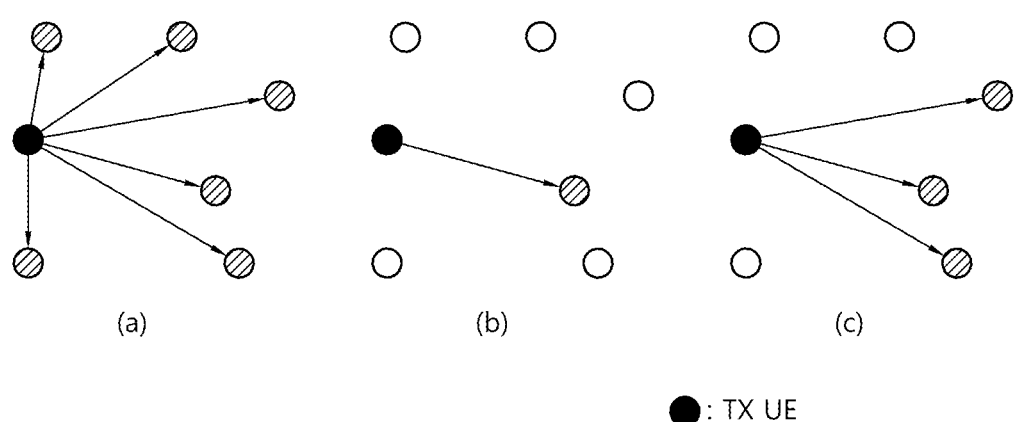
FIG. 7 shows three cast types, based on an embodiment of the present disclosure.

FIG. 7 shows three cast types, based on an embodiment of the present disclosure. The embodiment of FIG. 7 may be combined with various embodiments of the present disclosure. Specifically, (a) of FIG. 7 shows broadcast-type SL communication, (b) of FIG. 7 shows unicast type-SL communication, and (c) of FIG. 7 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Figure 8:
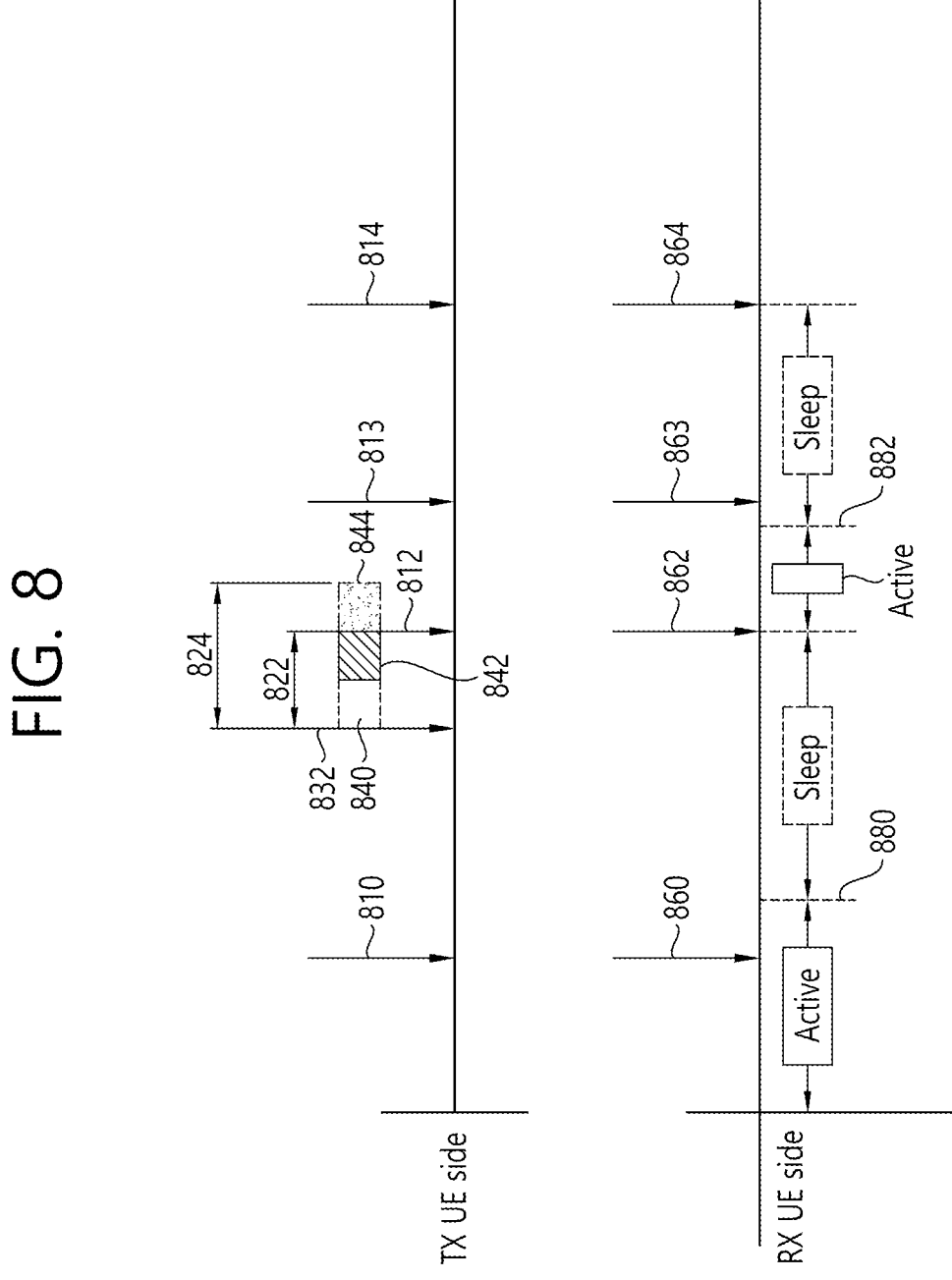
FIG. 8 shows a problem of a method in which a UE transmits information on an SL DRX active time, according to an embodiment of the present disclosure.

FIG. 8 shows a problem of a method in which a UE transmits information on an SL DRX active time, according to an embodiment of the present disclosure. The embodiment of FIG. 8 may be combined with various embodiments of the present disclosure.

Referring to FIG. 8, according to an embodiment of the present disclosure, a TX UE may indicate a first transmission resource selected based on a sensing result, and the TX UE may transmit SCI 810 representing the first transmission resource to another neighboring UE (e.g., an RX UE). For example, the RX UE may complete reception of SCI 860 representing the first transmission resource transmitted by the TX UE within an active time of the RX UE (see 880), and the SCI 860 may include transmission reservation resource information regarding second and third transmission resources. The RX UE may obtain transmission resource information for transmitting a physical sidelink shared channel (PSSCH) associated with the first SCI 860 currently received and transmission resource information (e.g., second transmission resource information, third transmission resource information) on next transmission, based on the transmission reservation resource information included in the SCI 860. For example, the RX UE may predict when the TX UE will perform second transmission (see 812) and/or third transmission (see 814), based on the completion of reception of the SCI 860 (see 880). For example, from time points 880 and 882 at which SCI reception is complete to time points 862 and 864 at which a next transmission resource is predicted to appear, the RX UE performing an SL DRX operation may perform a sleep operation or may not perform an operation of monitoring the PSCCH/PSSCH transmitted by the TX UE. In addition, for example, the TX UE may wake up at the next transmission resource positions 862 and 864 included in the SCI to monitor/receive the PSCCH/PSSCH transmitted by the TX UE.

Referring to FIG. 8, according to an embodiment of the present disclosure, in order to select a second transmission resource, the TX UE may perform sensing within any duration from a specific time point prior to a time point of a slot n 832 to the slot n 832. For example, the TX UE may start or trigger a resource (re)selection operation at the time point of the slot n 832, based on a result of the sensing performed above. For example, the TX UE may determine a selection window at the time point of the slot n 832. A time domain of the selection window may include at least one of a first time domain 822 from the time point of the slot n 832 to a first time point 812, a second time domain 824 from the first time point 812 to a second time point 813, and a third time point (not shown) from the first time point 812 to the second time point 813.

Meanwhile, for example, the number of (for example, two) physical SL resources remaining in the first time domain may be less than the number of resources (e.g., three slots) to be used in transmission of data (e.g., a V2X message) to be transmitted by the TX UE to the RX UE. For example, the number of available SL resources (e.g., one slot) remaining in the first time domain may be less than the number of SL resources (e.g., two slots) to be used in transmission of the data (e.g., the V2X message) to be transmitted by the TX UE to the RX UE. For example, an SL resource 840 which is a part of the SL resources remaining within the first time domain may not an idle resource as the result of the sensing performed above, and thus may be an excluded resource as the result of the sensing performed above. For example, an SL resource 842 which is another part of the SL resources remaining within the first time domain may be an SL resource not satisfying a PDB. Therefore, the TX UE may transmit, to the RX UE, information including even information on an additional available SL resource 844 within a time (e.g., the third time domain) after the first time domain, so as to satisfy the number of SL resources to be used in transmission of data to be transmitted to the RX UE. However, for example, the TX UE has no choice but to wake up at the next transmission resource positions 862 and 864 included in the SCI to monitor/receive the PSCCH/PSSCH transmitted by the TX UE. Therefore, for example, the RX UE may not be able to receive information 863 outside the active time of the RX UE. For example, the RX UE may not be able to receive the information 863 after the time point 882 at which reception of the SCI is complete. Therefore, for example, an operation in which the TX UE senses and/or (re)selects the additional available SL resource may be performed unnecessarily. For example, the RX UE may not be able to perform a DRX operation corresponding to transmission (e.g., aperiodic transmission of the TX UE) at a time point other than a time point at which transmission of the TX UE is predicted. For example, an SL resource transmitted by the TX UE to the RX UE may be wasted.

Figure 9:
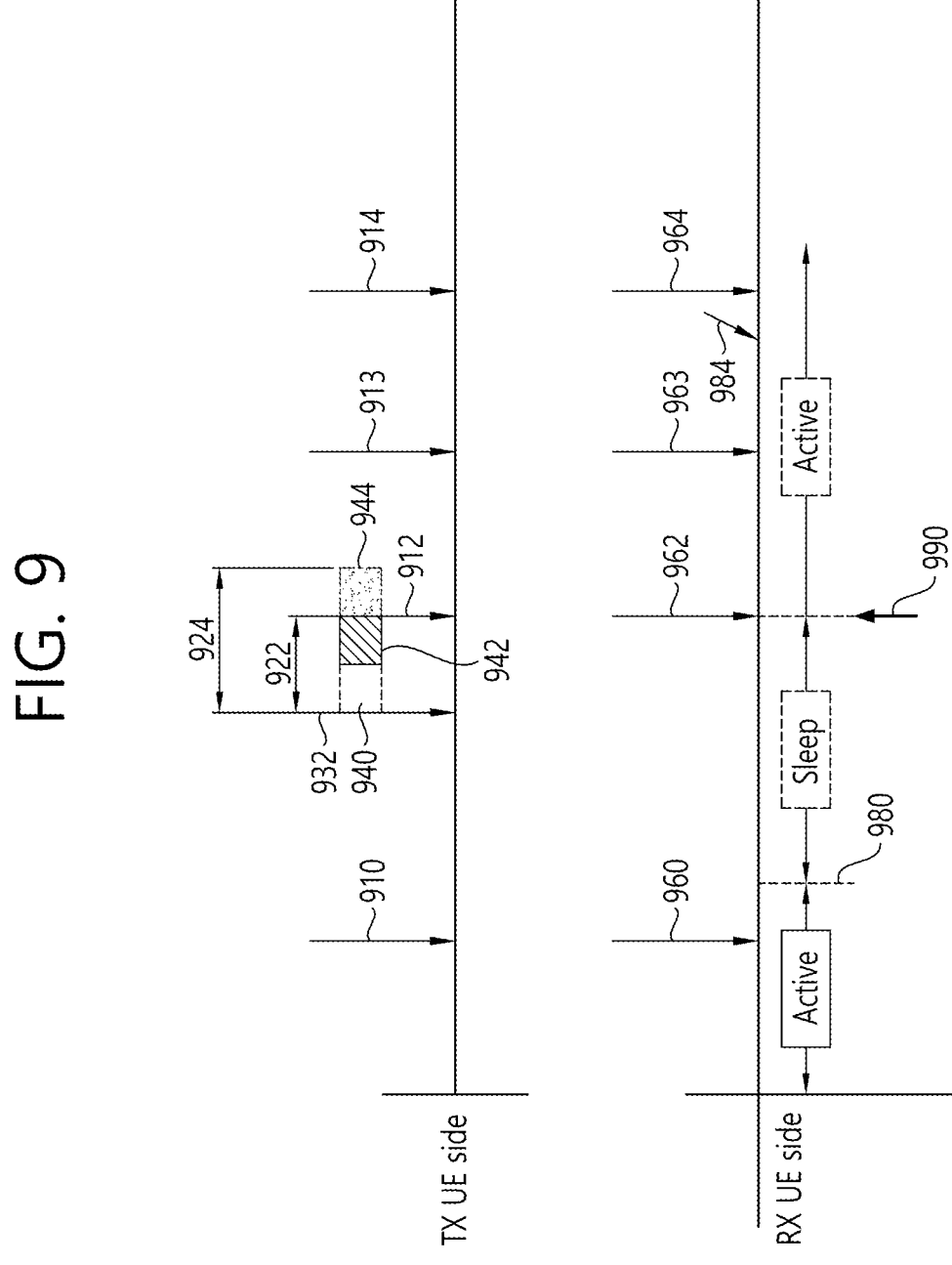
FIG. 9 shows a method in which a UE transmits information on an SL DRX active time, according to an embodiment of the present disclosure.

FIG. 9 shows a method in which a UE transmits information on an SL DRX active time, according to an embodiment of the present disclosure. The embodiment of FIG. 9 may be combined with various embodiments of the present disclosure.

Referring to FIG. 9, according to an embodiment of the present disclosure, a TX UE may indicate a first transmission resource selected based on a sensing result, and the TX UE may transmit SCI 910 representing the first transmission resource to another neighboring UE (e.g., an RX UE). For example, the RX UE may complete reception of SCI 960 representing a first transmission resource transmitted by the TX UE within an active time of the RX UE (see 980), and the SCI 960 may include transmission reservation resource information regarding second and third transmission resources. The RX UE may obtain transmission resource information for transmitting a physical sidelink shared channel (PSSCH) associated with the first SCI 960 currently received and transmission resource information (e.g., second transmission resource information, third transmission resource information) on next transmission, based on the transmission reservation resource information included in the SCI 960. For example, the RX UE may predict when the TX UE will perform second transmission (see 912) and/or third transmission (see 914), based on the completion of reception of the SCI 960 (see 980). For example, from a time point 980 at which SCI reception is complete to a time point 962 at which a next transmission resource is predicted to appear, the RX UE performing an SL DRX operation may perform a sleep operation or may not perform an operation of monitoring the PSCCH/PSSCH transmitted by the TX UE. In addition, for example, the TX UE may wake up at the next transmission resource position 962 included in the SCI to monitor/receive the PSCCH/PSSCH transmitted by the TX UE.

Referring to FIG. 9, according to an embodiment of the present disclosure, in order to select a second transmission resource, the TX UE may perform sensing within any duration from a specific time point prior to a time point of a slot n 932 to the slot n 932. For example, the TX UE may start or trigger a resource (re)selection operation at the time point of the slot n 932, based on a result of the sensing performed above. For example, the TX UE may determine a selection window at the time point of the slot n 932. A time domain of the selection window may include at least one of a first time domain 922 from the time point of the slot n 932 to a first time point 912, a second time domain 924 from the first time point 912 to a second time point 913, and a third time point (not shown) from the first time point 912 to the second time point 913. Meanwhile, for example, the number of (for example, two) physical resources remaining in the first time domain may be less than the number of resources (e.g., three slots) to be used in transmission of data (e.g., a V2X message) to be transmitted by the TX UE to the RX UE. For example, the number of available resources (e.g., one slot) remaining in the first time domain may be less than the number of resources (e.g., two slots) to be used in transmission of the data (e.g., the V2X message) to be transmitted by the TX UE to the RX UE. For example, a resource 940 which is a part of the resources remaining within the first time domain may not an idle resource as the result of the sensing performed above, and thus may be an excluded resource as the result of the sensing performed above. For example, a resource 942 which is another part of the resources remaining within the first time domain may be a resource not satisfying a PDB. For example, when the number of available resources within the first time domain is less than a threshold (e.g., the number of resources to be used in transmission of data to be transmitted by the TX UE to the RX UE), the TX UE may transmit information 990 for extending the active time of the RX UE to the RX UE. For example, the information for extending the active time of the RX UE may include at least one of information for transitioning from a sleep state to an awake state, information on an awake maintaining time for which the awake state shall be maintained, information for preventing the awake state from being returned to the sleep state according to a DRX operation based on reservation transmission resource information, and an awake time (e.g., a time until after k DRX cycles) for which the awake state shall be maintained until the sleep state according to the DRX operation based on the reservation transmission resource information.

For example, the TX UE may transmit, to the RX UE, information including even information on an additional available SL resource 944 within a time (e.g., the third time domain) after the first time domain, so that the number of available resources within a selection window is up to a number greater than or equal to a threshold. For example, the TX UE may wake up until a time of any position (e.g., 984) from the next transmission resource position 962 included in SCI to monitor/receive the PSCCH/PSSCH transmitted by the TX UE. Therefore, for example, the RX UE may receive information 963 outside the active time of the RX UE. For example, the RX UE may receive the information 963 after a time point (not shown) at which reception of the SCI is complete. Therefore, for example, an operation in which the RX UE senses and/or (re)selects the additional available SL resource can be effectively performed. For example, the RX UE may effectively perform a DRX operation corresponding to transmission (e.g., aperiodic transmission of the TX UE) at a time point other than a time point at which transmission of the TX UE is predicted. For example, an SL resource transmitted by the TX UE to the RX UE may not be wasted.

Figure 10:
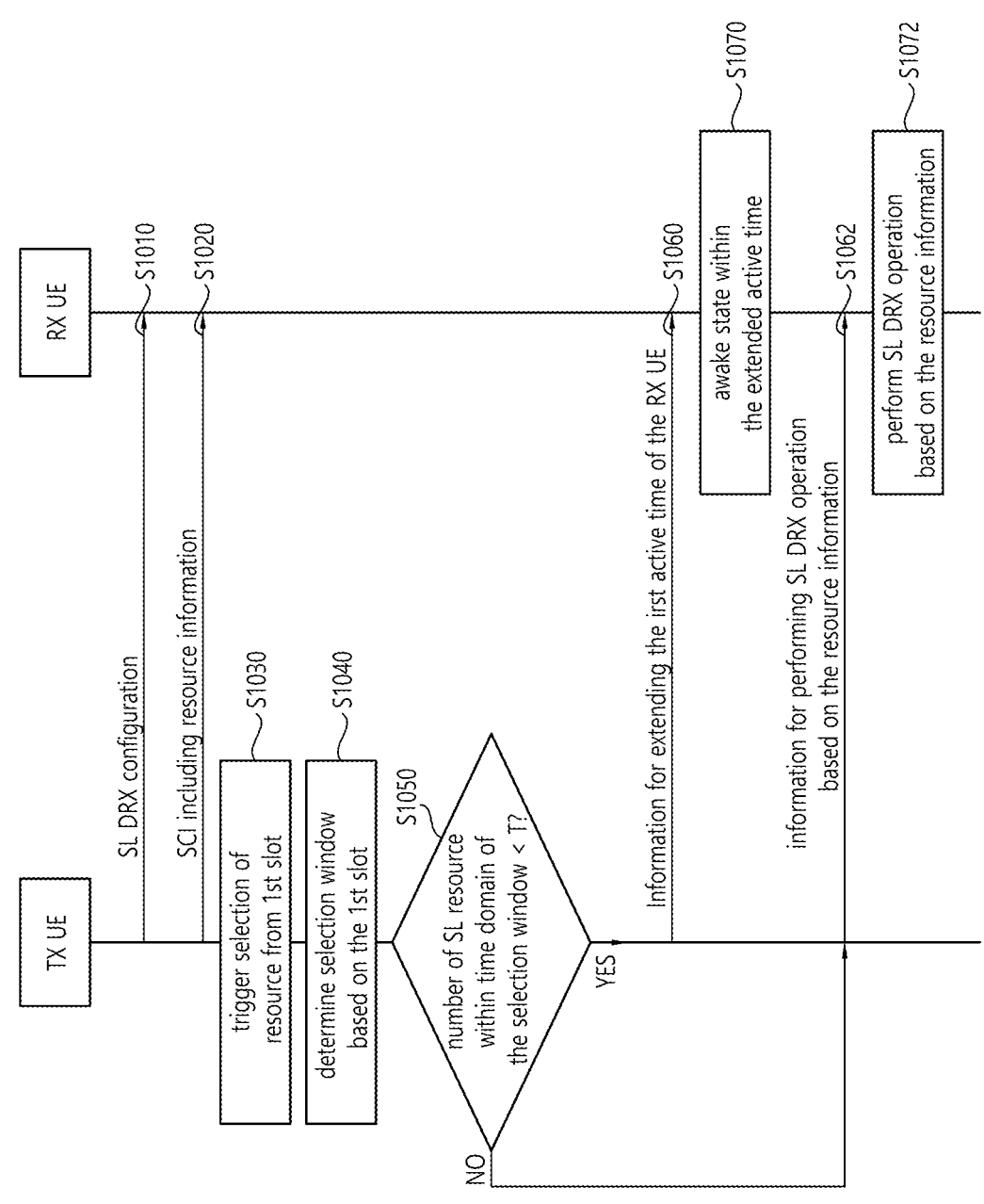
FIG. 10 shows a procedure in which a UE transmits information on an SL DRX active time, according to an embodiment of the present disclosure.

FIG. 10 shows a procedure in which a UE transmits information on an SL DRX active time, according to an embodiment of the present disclosure. The embodiment of FIG. 10 may be combined with various embodiments of the present disclosure.

Referring to FIG. 10, for example, a TX UE may transmit an SL DRX configuration including information on an active time of an RX UE to the RX UE through PC5-RRC connection or the like (S1010). For example, the TX UE may transmit SCI including resource information (e.g., information on reserved transmission resource(s)) to the RX UE (S1020). For example, the TX UE may start and/or trigger resource selection in a first slot (e.g., a slot n) (S1030). For example, the TX UE may determine a selection window, based on the first slot (S1040). For example, the TX UE may determine whether the number of SL resources within a time domain of the selection window is less than a threshold (e.g., T) (S1050). For example, when the number of SL resources within the time domain of the selection window is less than the threshold (e.g., T), the TX UE may transmit information for extending the active time of the RX UE to the RX UE (S1060). For example, the RX UE may transition to an awake state within the extended active time and/or maintain an awake state (e.g., maintain a specific time, and perform an SL DRX operation based on the resource information after the specific time) (S1070). For example, when the number of SL resources within the time domain of the selection window is greater than or equal to the threshold (e.g., T), the TX UE may transmit information for performing the SL DRX operation based on the resource information to the RX UE (S1062). In step S1062, when the number of SL resources within the time domain of the selection window is greater than or equal to the threshold (e.g., T), the TX UE may not transmit the information for extending the active time of the RX UE to the RX UE. For example, the RX UE may perform the SL DRX operation based on the resource information (S1072). In step S1072, for example, the RX UE may maintain the awake state within the SL DRX active time based on the resource information, and the RX UE may maintain a sleep state outside the SL DRX active time based on the resource information.

According to an embodiment of the present disclosure, for a power saving operation (e.g., a sidelink DRX operation) of a UE, a sidelink DRX configuration (e.g., a sidelink DRX cycle, a sidelink DRX onduration, a sidelink DRX off-duration), a timer for supporting a sidelink DRX operation (e.g., an SL DRX inactivity timer, an SL DRX hybrid automatic repeat request (HARQ) round-trip time (RTT) timer, an SL DRX retransmission timer, etc.) to be used by a power saving UE (P-UE) shall be defined. In addition, an operation of a transmitting (TX) UE and receiving (RX) UE may be defined in an on-duration (a duration in which sidelink reception/transmission can be performed)/off-duration (a duration in which an operation is performed in a sleep mode). For example, the SL DRX operation (e.g., an SL DRX timer operation) of the RX UE may be applied differently depending on a resource selection/reservation operation of the TX UE. For example, in embodiment(s) of the present disclosure, an SL DRX operation method of the RX UE (or TX UE) depending on the resource (re)selection/reservation operation of the TX UE may be proposed.

Figure 11:
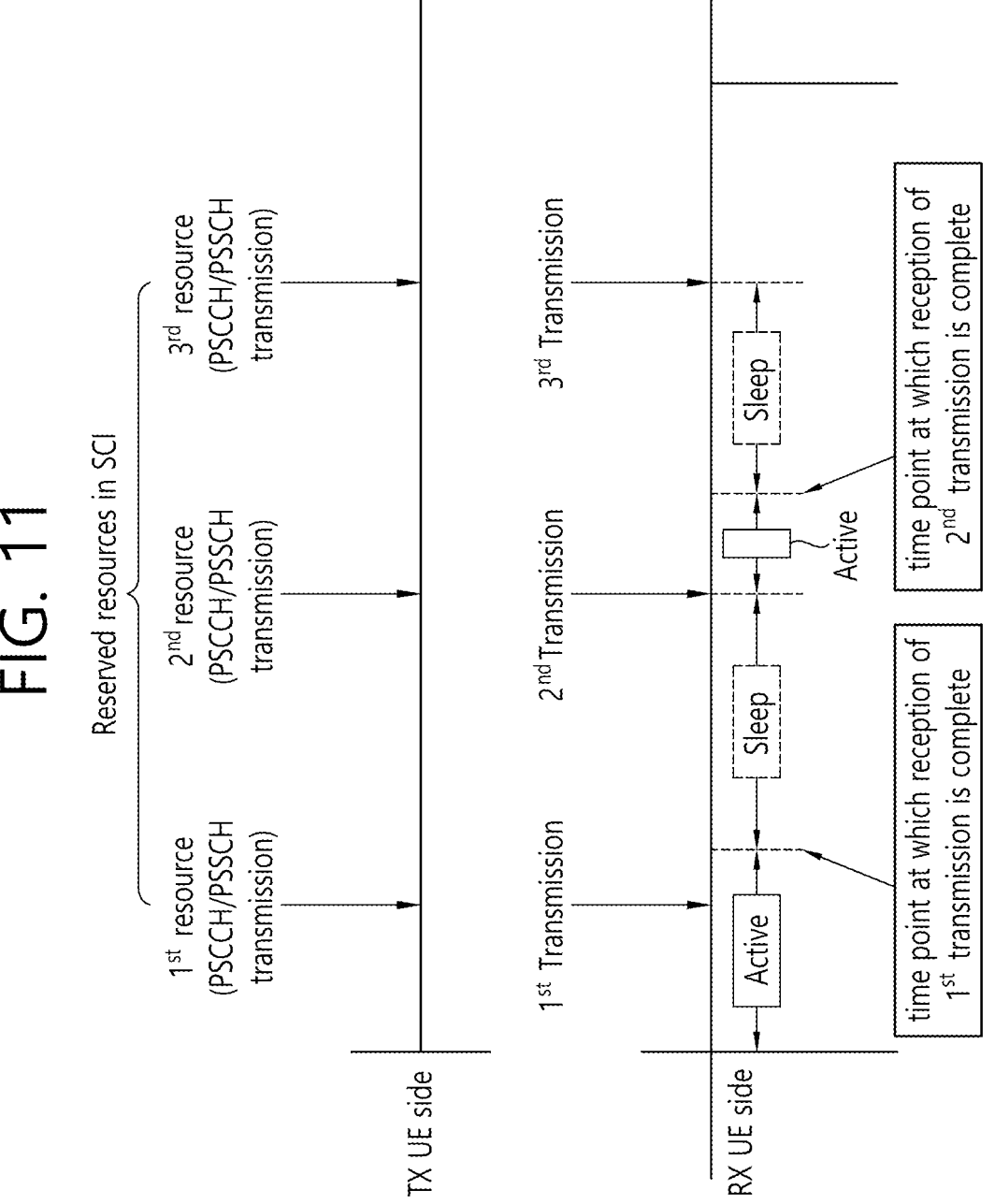
FIG. 11 shows a method of performing an SL DRX operation of an RX UE, based on resource information of SCI, according to an embodiment of the present disclosure.

FIG. 11 shows a method of performing an SL DRX operation of an RX UE, based on resource information of SCI, according to an embodiment of the present disclosure. The embodiment of FIG. 11 may be combined with various embodiments of the present disclosure.

Referring to FIG. 11, according to an embodiment of the present disclosure, a TX UE may monitor sidelink control information (SCI) of a different neighboring UE to perform a sensing operation, and may select a transmission resource within a selection window from among idle resources, based on a sensing result. For example, the TX UE may transmit the SCI to the different neighboring UE (e.g., RX UE) by indicating the selected transmission resource through the SCI. For example, the RX UE may receive the SCI transmitted by the TX UE, and may obtain transmission resource information for transmitting a physical sidelink shared channel (PSCCH) associated with the SCI currently received and transmission resource information for next transmission, based on transmission reservation resource information included in the SCI. For example, the TX UE may indicate up to three transmission resources through the SCI. For example, the TX UE may transmit not only a transmission resource associated with the SCI currently received but also second and third transmission resource information to the RX UE to allow the RX UE to predict when the TX UE performs 2nd/third transmission. For example, as shown in FIG. 11, the RX UE performing the SL DRX operation may perform a sleep operation from a time point at which the SCI is received to a time point at which a next transmission resource appears, or may not perform an operation of monitoring the PSCCH/PSSCH transmitted by the TX UE. In addition, for example, the TX UE may wake up at a next transmission resource position included in the SCI to monitor/receive the PSCCH/PSSCH transmitted by the TX UE.

Figure 12:
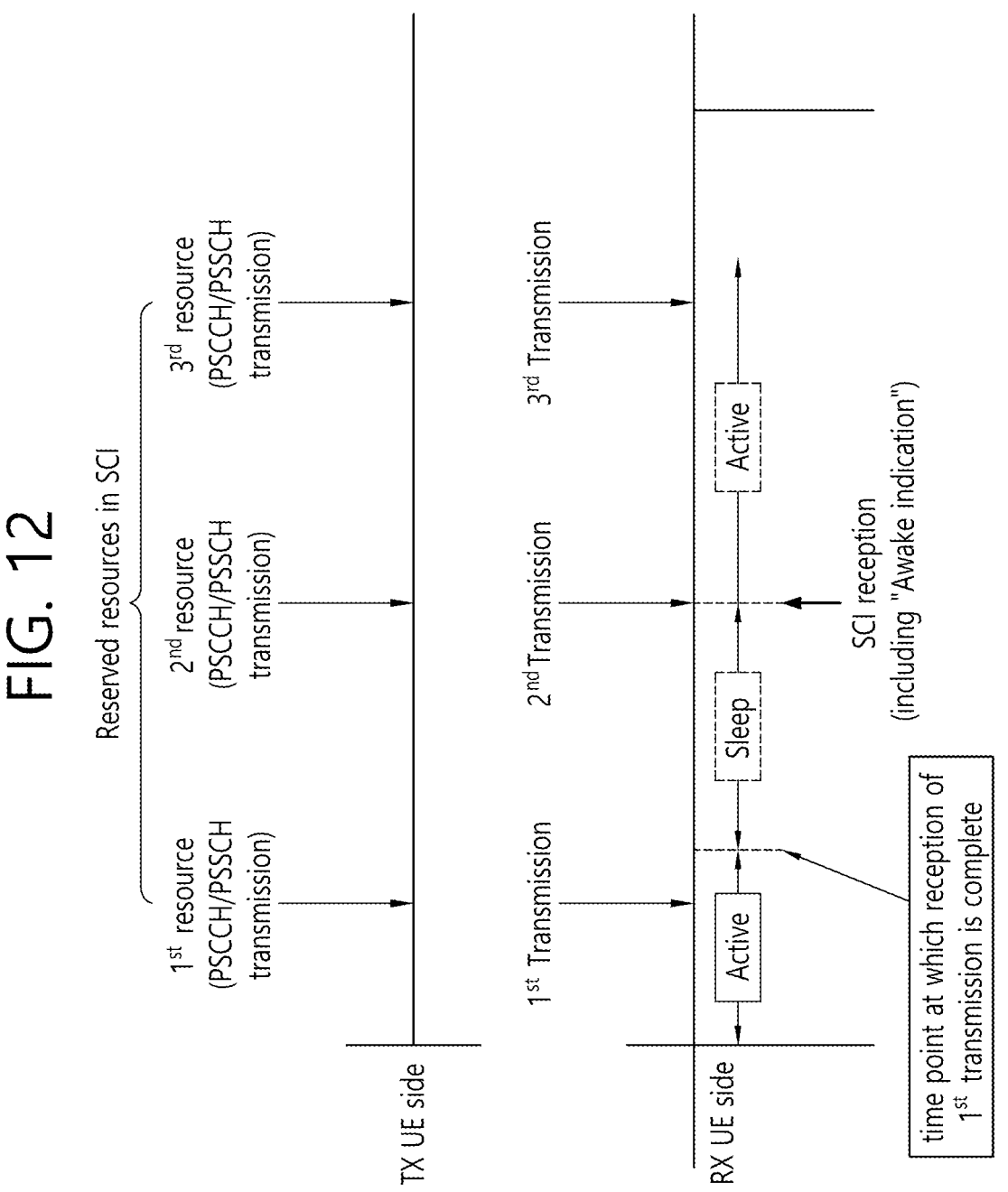
FIG. 12 shows a method of performing an SL DRX operation of an RX UE, based on an awake indication of SCI, according to an embodiment of the present disclosure.

FIG. 12 shows a method of performing an SL DRX operation of an RX UE, based on an awake indication of SCI, according to an embodiment of the present disclosure. The embodiment of FIG. 12 may be combined with various embodiments of the present disclosure.

Referring to FIG. 12, according to an embodiment of the present disclosure, for example, when a selection window is not left enough in resource selection of a TX UE or when a packet data budget (PDB) is not left enough, there may be a case where a remaining resource is not present after resources chosen by previous SCI (e.g., there may be no resource satisfying the PDB). For example, alternatively, the selection window may not be left enough and thus a slot may not be physically left enough. For example, alternatively, even if the slot is left to some extent, all resources remaining after performing sensing may be excluded (e.g., the resources remaining as a result of sensing are not idle resources, and thus may be excluded from selected resources). When such a situation is expected (e.g., when a gap between the PDB and a next transmission resource indicated with the SCI is less than or equal to a specific level, or when all resources remaining after performing sensing are excluded (e.g., when the resources remaining as a result of sensing are not idle resources and thus are excluded from selected resources), or the like), the TX UE may use the SCI to indicate the RX UE so as to allow the RX UE not to perform a sleep operation based on next transmission resource information included in the SCI, and may indicate the RX UE to be continuously awake. For example, the TX UE may indicate the RX UE not to perform the sleep operation to allow the RX UE to continuously monitor a PSCCH/PSSCH transmitted by the TX UE. For example, the TX UE may indicate the RX UE to continuously maintain an awake state. For example, the TX UE may indicate the RX UE to continuously maintain the awake state by including an awake indication. Alternatively, for example, the TX UE may indicate this by including a recommended awake time for which the awake state shall be maintained, together with the awake indication. For example, when the indication includes the recommended awake time, the RX UE may maintain the awake state during the recommended time, instead of maintaining the awake state based on next transmission resource information. For example, after the recommended awake time elapses, the RX UE may perform again an SL DRX operation (e.g., sleep/awake) based on the transmission resource information included in the SCI, based on the next transmission resource information included in the SCI. For example, when the TX UE does not have the selection window left enough or the PDB left enough, the TX UE may not have remaining resources after resources chosen by the previous SCI. For example, since the TX UE may transmit the PSCCH/PSSCH to the RX UE by selecting a resource other than the resource chosen by the previous SCI, the TX UE may indicate the RX UE (e.g., through the SCI) to continuously maintain the awake state.

According to an embodiment of the present disclosure, for example, the TX UE may indicate the RX UE to continuously maintain an awake time by transmitting SCI including an awake indication (e.g., an awake indication not including the recommended awake time), and then the TX UE may indicate again the RX UE to perform the SL DRX operation based on the transmission resource information included in the SCI. For example, when the RX UE is indicated from the TX UE to perform again the SL DRX operation, as shown in FIG. 11, the RX UE may perform the SL DRX operation (e.g., sleep/awake) based on the transmission resource information included in the SCI.

According to an embodiment of the present disclosure, for example, when the RX UE runs a round-trip time (RTT) timer (e.g., SL hybrid automatic repeat request (HARQ) RTT timer) from a time point at which the RX UE receives SCI to a following retransmission resource time point indicated by the SCI, if it is a time after a time point including the following retransmission resource time point and if a length (e.g., a maximum possible length) of a selection window of the TX UE, consisting of a candidate resource (e.g., a candidate resource not exceeding a remaining PDB) to be subjected to resource reselection based on pre-emption/re-evaluation is less than a pre-determined (e.g., minimum) threshold (e.g., the threshold may be a value determined per priority), signaling transmission (e.g., SCI or medium access control (MAC) control element (CE) or PC5 radio resource control (RRC) message) used by the TX UE to indicate the RX UE to wake up may be allowed.

According to an embodiment of the present disclosure, for example, when the RX UE runs an RTT timer (e.g., SL HARQ RTT timer) from a time point at which the RX UE receives SCI to a following retransmission resource time point indicated by the SCI, if it is a time after a time point including the following retransmission resource time point and if a length (e.g., a maximum possible length) of a selection window of the TX UE, consisting of a candidate resource (e.g., a candidate resource not exceeding a remaining PDB) to be subjected to resource reselection based on pre-emption/re-evaluation is less than a pre-determined (e.g., minimum) threshold (e.g., the threshold may be a value determined per priority), and/or if an end time point (e.g., a latest possible end time point) related to the selection window of the TX UE is prior to a pre-determined minimum threshold (e.g., the threshold may be a value determined per priority), signaling transmission (e.g., SCI or MAC CE or PC5 RRC message) used by the TX UE to indicate the RX UE to wake up may be allowed.

According to an embodiment of the present disclosure, for example, when the RX UE receives signaling indicating the wake-up from the TX UE, the RX UE may regard an awake duration included in information on a wake-up time included in the signaling as an active time (e.g., an SL DRX active time) of the RX UE, or the RX UE may be configured to run a (pre-determined) SL DRX-related re-transmission (RE-TX) timer of the RX UE from a corresponding reception time of the signaling.

An embodiment of the present disclosure may have various effects. For example, according to an embodiment of the present disclosure, the RX UE may receive data used in transmission of resources, of which a number is at least a threshold, based on information on an additional available SL resource. According to an embodiment of the present disclosure, the TX UE may not fail in or give up data transmission for the RX UE. According to an embodiment of the present disclosure, for example, the TX UE may wake up at a time from a next transmission resource position included in the SCI to any position to monitor/receive a PSCCH/ PSSCH transmitted by the TX UE, thereby effectively performing an operation in which the TX UE senses and/or (re)selects an additional SL resource. According to an embodiment of the present disclosure, for example, the RX UE may effectively perform an SL DRX operation corresponding to transmission (e.g., aperiodic transmission of the TX UE) at a time point other than a time point at which transmission of the TX UE is predicted. According to an embodiment of the present disclosure, for example, an SL resource transmitted by the TX UE to the RX UE may not be wasted. For example, according to an embodiment of the present disclosure, even if the RX UE predicts that the TX UE additionally transmits a reselected resource to the RX UE within an SL DRX inactive time of the RX UE after an end time point of the selection window, the TX UE may not fail in or give up transmission of the RX UE.

FIG. 13 shows a method in which a first device performs wireless communication, according to an embodiment of the present disclosure. The embodiment of FIG. 13 may be combined with various embodiments of the present disclosure.

Referring to FIG. 13, in step S1310, the first device may obtain a sidelink (SL) discontinuous reception (DRX) configuration including information related to an active time of a second device. In step S1320, the first device may start resource selection in a first slot. In step S1330, the first device may determine a selection window, based on the first slot. In step S1340 the first device may transmit information for extending the active time of the second device to the second device through a first physical sidelink control channel (PSCCH) or a first physical sidelink shared channel (PSSCH) related to the first PSCCH, based on that the number of SL resources in a time domain of the selection window is less than a threshold.

Additionally or alternatively, the information for extending the active time of the second device may be transmitted through a medium access control (MAC) control element (CE) or radio resource control (RRC) signaling.

Additionally or alternatively, the information for extending the active time of the second device may be transmitted through sidelink control information (SCI).

Additionally or alternatively, the number of SL resources may be the number of available SL resources in the time domain of the selection window.

Additionally or alternatively, the number of SL resources may be the number of SL resources satisfying a packet data budget (PDB) in the time domain of the selection window.

Additionally or alternatively, the number of SL resource may be the number of idle SL resources selected within the selection window, based on sensing of the first device.

Additionally or alternatively, the method may further include transmitting first SCI for scheduling a second PSSCH and second SCI to the second device through a second PSCCH, based on the first device, wherein the first SCI includes information related to a time domain of a second resource.

Additionally or alternatively, the first SCI may include information for allowing the second device to perform an SL DRX operation based on resource information between the time domain of the first resource and the time domain of the second resource.

Additionally or alternatively, the information for extending the active time of the second device may not be transmitted through the first PSCCH or the first PSSCH related to the first PSCCH, based on that the number of SL resources within the time domain of the selection window is greater than or equal to the threshold.

Additionally or alternatively, the information for extending the active time of the second device may include information for waking up the second device after a time point at which the active time ends.

Additionally or alternatively, the information for extending the active time of the second device may include information for disabling an SL DRX operation based on resource information included in first SCI to be transmitted to the second device.

Additionally or alternatively, the method may further include transmitting first SCI for scheduling a second PSSCH and second SCI to the second device through a second PSCCH, based on the first device, wherein the first SCI includes information related to a time domain of a second resource.

Additionally or alternatively, the first SCI may include information for allowing the second device to perform an SL DRX operation based on resource information between the time domain of the first resource and the time domain of the second resource.

Additionally or alternatively, the information for extending the active time of the second device further may include information on an awake time of the second device after the wake-up of the second device.

Additionally or alternatively, the information on the awake time of the second device may further include information for enabling an SL DRX operation based on resource information included in first SCI to be transmitted to the second device, after the awake time of the second device expires.

Additionally or alternatively, information for extending the active time of the second device may be transmitted to the second device through the first PSCCH or the first PSSCH related to the first PSCCH, based on that a time point at which the time domain of the selection window ends is prior to a first time point.

Additionally or alternatively, information for extending the active time of the second device may be transmitted to the second device through the first PSCCH or the first PSSCH related to the first PSCCH, based on that a magnitude of a time domain of the selection window ends is prior to a first time point.

Additionally or alternatively, the first time point or the first time may be determined per priority.

Additionally or alternatively, the first slot may be a slot which exists within an inactive time of the second device.

Additionally or alternatively, the inactive time of the second device may be a time other than the active time of the second device.

Additionally or alternatively, the inactive time of the second device may be a time for which an SL hybrid automatic repeat request (HARQ) round-trip time (RTT) timer runs Additionally or alternatively, resource reselection based on pre-emption or re-evaluation may be started in the first slot.

Additionally or alternatively, a time point at which a time domain of the selection window ends may be a time point between a time point at which the active time of the second device arrives and a time point at which the active time of the second device ends.

Additionally or alternatively, the first time point may be the same time point as a time point at which the active time of the second device ends, or is a time point prior to the time point at which the active time of the second device ends.

The proposed method may be applied to an apparatus according to various embodiments of the present disclosure. First, the processor 102 of the first device 100 may obtain a sidelink (SL) discontinuous reception (DRX) configuration including information related to an active time of a second device. In addition, the processor 102 of the first device 100 may start resource selection in a first slot. In addition, the processor 102 of the first device 100 may determine a selection window, based on the first slot. In addition, the processor 102 of the first device 100 may control the transceiver 106 to transmit information for extending the active time of the second device to the second device through a first physical sidelink control channel (PSCCH) or a first physical sidelink shared channel (PSSCH) related to the first PSCCH, based on that the number of SL resources in a time domain of the selection window is less than a threshold.

According to an embodiment of the present disclosure, a first device performing wireless communication may be provided. The first device may include: one or more memories storing instructions: one or more transceivers; and one or more processors coupling the one or more memories and the one or more transceivers. The one or more processors may execute the instructions to: obtain an SL DRX configuration including information related to an active time of a second device: start resource selection in a first slot; and determine a selection window, based on the first slot. For example, the first device may transmit information for extending the active time of the second device to the second device through a first PSCCH or a first PSSCH related to the first PSCCH, based on that the number of SL resources in a time domain of the selection window is less than a threshold.

According to an embodiment of the present disclosure, an apparatus configured to control a first user equipment (UE) may be provided. The apparatus may include one or more processors; and one or more memories operatively coupled by the one or more processors and storing instructions. The one or more processors may execute the instructions to: obtain an SL DRX configuration including information related to an active time of a second UE: start resource selection in a first slot: and determine a selection window, based on the first slot. For example, the one or more processors may execute the instructions to transmit information for extending the active time of the second UE to the second UE through a first PSCCH or a first PSSCH related to the first PSCCH, based on that the number of SL resources in a time domain of the selection window is less than a threshold.

According to an embodiment of the present disclosure, a non-transitory computer-readable medium having instructions recorded thereon may be proposed. The instructions, when executed by one or more processors, may cause the one or more processors to: cause a first device to obtain an SL DRX configuration including information related to an active time of a second device, cause the first device to start resource selection in a first slot, and cause the first device to determine a selection window, based on the first slot. For example, the instructions, when executed by the one or more processors, may cause the one or more processors to cause the first device to transmit information for extending the active time of the second device to the second device through a first PSCCH or a first PSSCH related to the first PSCCH, based on that the number of SL resources in a time domain of the selection window is less than a threshold.

FIG. 14 shows a method in which a second device performs wireless communication, according to an embodiment of the present disclosure. The embodiment of FIG. 14 may be combined with various embodiments of the present disclosure.

Referring to FIG. 14, in step S1410, the second device may obtain an SL DRX configuration including information related to an active time of the second device. In step S1420, the second device may receive information for extending the active time of the second device from a first device through a first PSCCH or a first PSSCH related to the first PSCCH, based on that the number of SL resources within the time domain of the selection window determined based on the first slot is less than a threshold.

The proposed method may be applied to an apparatus according to various embodiments of the present disclosure. First, the processor 202 of the second device 200 may obtain an SL DRX configuration including information related to an active time of the second device. In addition, the processor 202 of the second device 200 may control the transceiver 206 to receive information for extending the active time of the second device from a first device through a first PSCCH or a first PSSCH related to the first PSCCH, based on that the number of SL resources within the time domain of the selection window determined based on the first slot is less than a threshold.

According to an embodiment of the present disclosure, a second device performing wireless communication may be provided. The second device may include: one or more memories storing instructions: one or more transceivers; and one or more processors coupling the one or more memories and the one or more transceivers. The one or more processors may execute the instructions to obtain an SL DRX configuration including information related to an active time of the second device, and may receive information for extending the active time of the second device from a first device through a first PSCCH or a first PSSCH related to the first PSCCH, based on that the number of SL resources within the time domain of the selection window determined based on the first slot is less than a threshold.

According to an embodiment of the present disclosure, an apparatus configured to control a second UE may be provided. The apparatus may include: one or more processors; and one or more memories operatively coupled by the one or more processors and storing instructions. The one or more processors may execute the instructions to: obtain an SL DRX configuration including information related to an active time of the second UE. For example, the one or more processors may execute the instructions to receive information for extending the active time of the second device from a first device through a first PSCCH or a first PSSCH related to the first PSCCH, based on that the number of SL resources within the time domain of the selection window determined based on the first slot is less than a threshold.

According to an embodiment of the present disclosure, a non-transitory computer-readable medium having instructions recorded thereon may be proposed. The instructions, when executed by one or more processors, may cause the one or more processors to: cause a second device to obtain an SL DRX configuration including information related to an active time of the second device. For example, the instructions, when executed by the one or more processors, may cause the one or more processors to: cause the second device to receive information for extending the active time of the second device from a first device through a first PSCCH or a first PSSCH related to the first PSCCH, based on that the number of SL resources within the time domain of the selection window determined based on the first slot is less than a threshold.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 15:
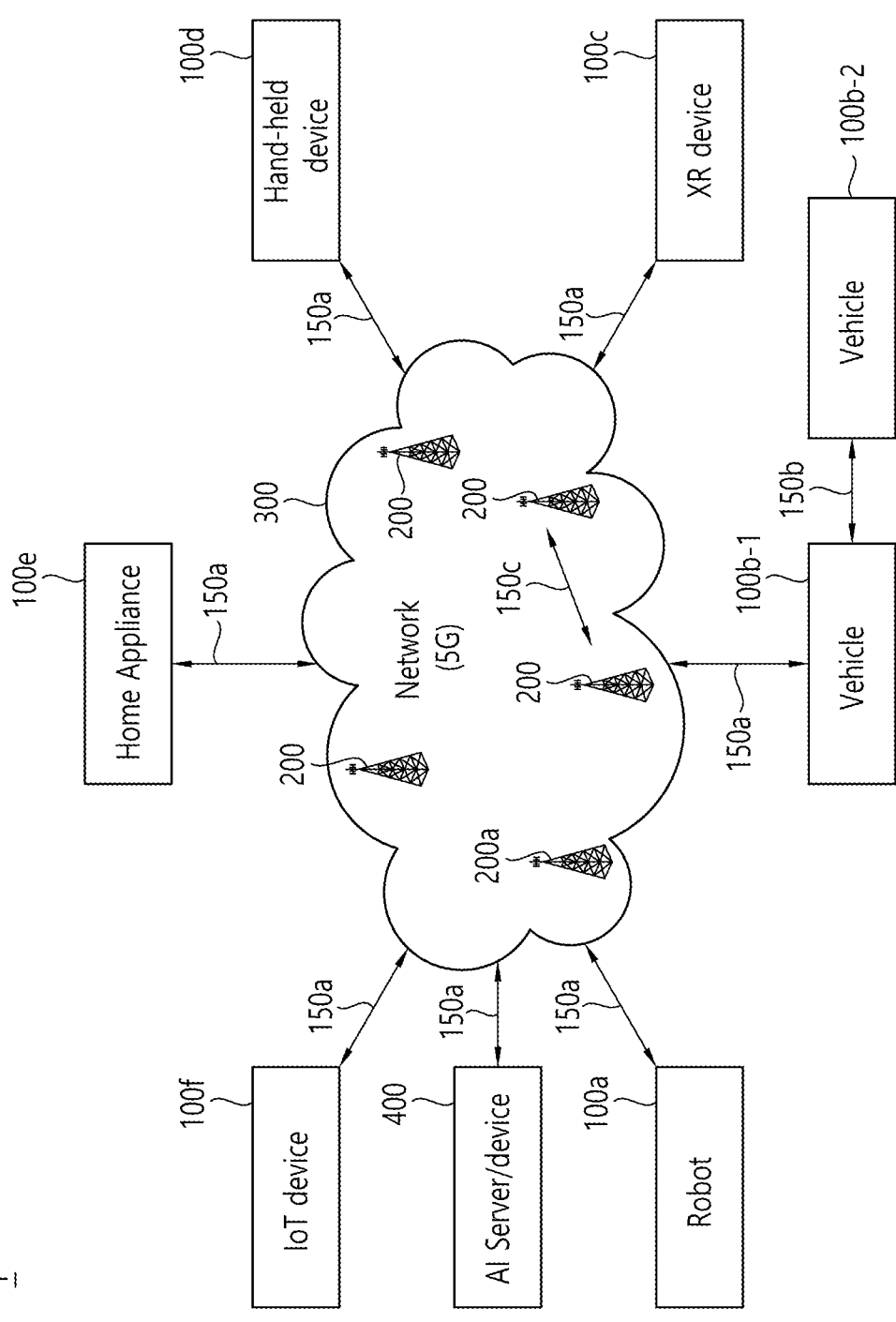
FIG. 15 shows a communication system 1, based on an embodiment of the present disclosure.

FIG. 15 shows a communication system 1, based on an embodiment of the present disclosure. The embodiment of FIG. 15 may be combined with various embodiments of the present disclosure.

Referring to FIG. 15, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an extended Reality (XR) device 100c, a hand-held device 100d, a home appliance 100e, an Internet of Things (IOT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IOT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 16:
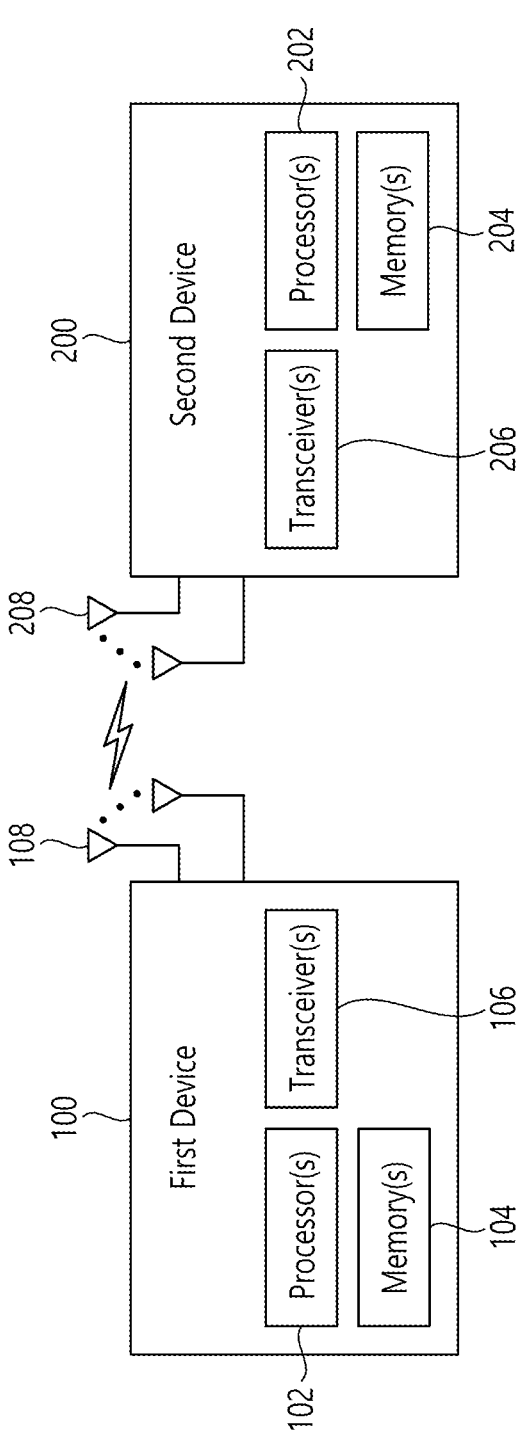
FIG. 16 shows wireless devices, based on an embodiment of the present disclosure.

FIG. 16 shows wireless devices, based on an embodiment of the present disclosure. The embodiment of FIG. 16 may be combined with various embodiments of the present disclosure.

Referring to FIG. 16, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 15.

The first wireless device 100 may include one or more processors 102 and at least one memory 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and at least one memory 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory (s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information accordinging to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 17:
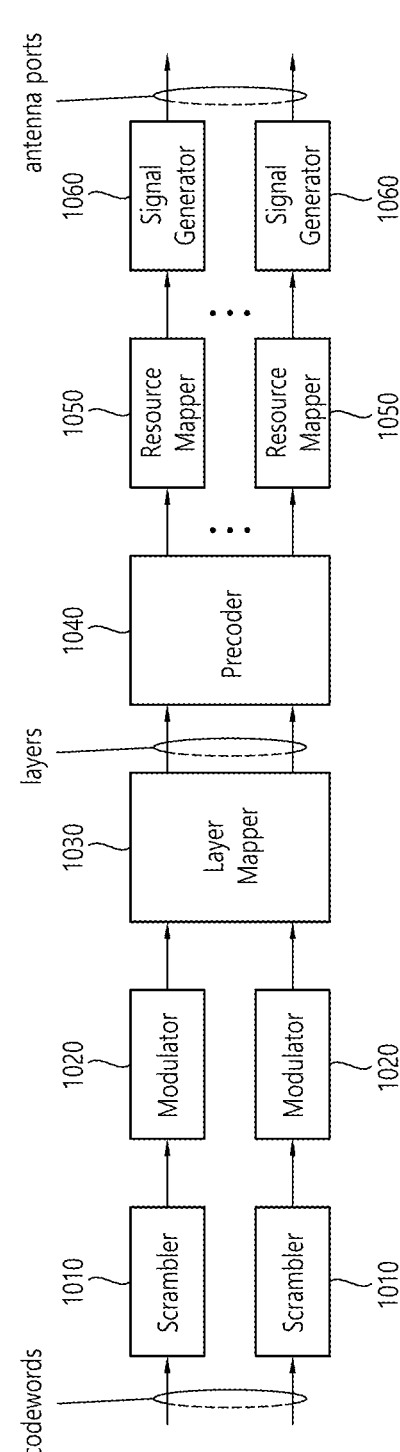
FIG. 17 shows a signal process circuit for a transmission signal, based on an embodiment of the present disclosure.

FIG. 17 shows a signal process circuit for a transmission signal, based on an embodiment of the present disclosure. The embodiment of FIG. 17 may be combined with various embodiments of the present disclosure.

Referring to FIG. 17, a signal processing circuit 1000 may include scramblers 1010, modulators 1020, a layer mapper 1030, a precoder 1040, resource mappers 1050, and signal generators 1060. An operation/function of FIG. 17 may be performed, without being limited to, the processors 102 and 202 and/or the transceivers 106 and 206 of FIG. 16. Hardware elements of FIG. 17 may be implemented by the processors 102 and 202 and/or the transceivers 106 and 206 of FIG. 16. For example, blocks 1010 to 1060 may be implemented by the processors 102 and 202 of FIG. 16. Alternatively, the blocks 1010 to 1050 may be implemented by the processors 102 and 202 of FIG. 16 and the block 1060 may be implemented by the transceivers 106 and 206 of FIG. 16.

Codewords may be converted into radio signals via the signal processing circuit 1000 of FIG. 17. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 17. For example, the wireless devices (e.g., 100 and 200 of FIG. 16) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

FIG. 18 shows another example of a wireless device, based on an embodiment of the present disclosure. The wireless device may be implemented in various forms according to a use-case/service (refer to FIG. 15). The embodiment of FIG. 18 may be combined with various embodiments of the present disclosure.

Referring to FIG. 18, wireless devices 100 and 200 may correspond to the wireless devices 100 and 200 of FIG. 16 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 16. For example, the transceiver(s) 114 may include the one or more transceivers 106 and 206 and/or the one or more antennas 108 and 208 of FIG. 16. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 15), the vehicles (100*b*-1 and 100*b*-2 of FIG. 15), the XR device (100*c* of FIG. 15), the hand-held device (100*d* of FIG. 15), the home appliance (100*e* of FIG. 15), the IoT device (100 *f* of FIG. 15), a digital broadcast terminal, a hologram device, a public safety device, an MTC device, a medicine device, a fintech device (or a finance device), a security device, a climate/environment device, the AI server/device (400 of FIG. 15), the BSs (200 of FIG. 15), a network node, etc. The wireless device may be used in a mobile or fixed place according to a use-example/service.

In FIG. 18, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 18 will be described in detail with reference to the drawings.

FIG. 19 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT). The embodiment of FIG. 19 may be combined with various embodiments of the present disclosure.

Referring to FIG. 19, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 18, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 20:
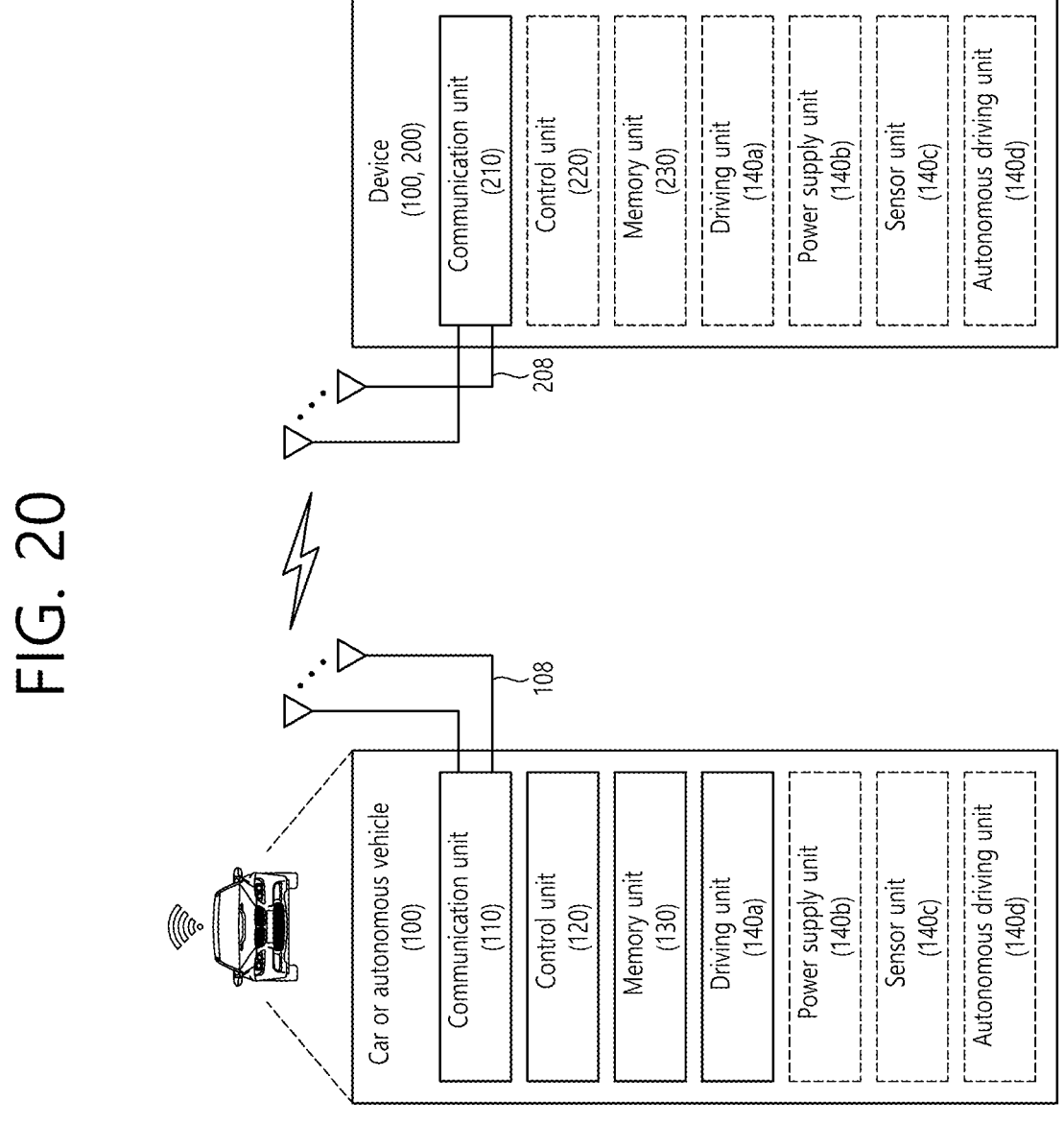
FIG. 20 shows a vehicle or an autonomous vehicle, based on an embodiment of the present disclosure.

FIG. 20 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc. The embodiment of FIG. 20 may be combined with various embodiments of the present disclosure.

Referring to FIG. 20, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 18, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method comprising:

obtaining, by a first device, a sidelink (SL) discontinuous reception (DRX) configuration including information related to an active time of a second device;

starting, by the first device, resource selection in a first slot;

determining, by the first device, a selection window, based on the first slot;

transmitting, by the first device to the second device, a first sidelink control information (SCI) including information related to resources; and transmitting, by the first device, information for extending the active time of the second device to the second device through a first physical sidelink control channel (PSCCH) or a first physical sidelink shared channel (PSSCH) related to the first PSCCH, based on a gap between packet delay budget (PDB) and a next resource indicated by the first SCI being less than or equal to a first level.

2. The method of claim 1, wherein the information for extending the active time of the second device is transmitted through a medium access control (MAC) control element (CE) or radio resource control (RRC) signaling or SCI.

3. The method of claim 1, further comprising transmitting, by the first device, second SCI for scheduling a second PSSCH and third SCI to the second device through a second PSCCH, based on a first resource, wherein the second SCI includes information related to a second resource and information for allowing the second device to perform an SL DRX operation based on resource information between a time domain of the first resource and a time domain of the second resource.

4. The method of claim 1, wherein the information for extending the active time of the second device is not transmitted through the first PSCCH or the first PSSCH related to the first PSCCH, based on the gap between the PDB and the next resource indicated by the first SCI being greater than the first level.

5. The method of claim 1, wherein the information for extending the active time of the second device includes information for waking up the second device after a time point at which the active time ends, and includes information for disabling an SL DRX operation based on resource information included in second SCI to be transmitted to the second device.

6. The method of claim 1, wherein information for extending the active time of the second device is transmitted to the second device through the first PSCCH or the first PSSCH related to the first PSCCH, based on that a time point at which a time domain of the selection window ends is prior to a first time point.

7. The method of claim 6, wherein the first slot is a slot which exists within an inactive time of the second device, and wherein resource reselection based on pre-emption or re-evaluation is started in the first slot, and wherein the first time point is the same time point as a time point at which the active time of the second device ends, or is a time point prior to the time point at which the active time of the second device ends.

8. The method of claim 7, further comprising transmitting, by the first device, second SCI for scheduling of a second PSCCH or third SCI to the second device through a second PSCCH, based on a first resource, the second SCI including information related to a second resource, wherein the second SCI includes information for allowing the second device to perform an SL DRX operation based on resource information between a time domain of the first resource and a time domain of the second resource.

9. The method of claim 6, wherein the information for extending the active time of the second device further includes information on an awake time of the second device after wake-up of the second device.

10. The method of claim 9, wherein the information on the awake time of the second device further includes information for enabling an SL DRX operation based on resource information included in the second SCI to be transmitted to the second device, after the awake time of the second device expires.

11. A first device comprising:

at least one transceiver;

at least one processor; and at least one memory connected to the at least one processor and storing instructions that, based on being executed, cause the first device to perform operations comprising:

obtaining a sidelink (SL) discontinuous reception (DRX) configuration including information related to an active time of a second device; and starting resource selection in a first slot;

determining a selection window, based on the first slot;

transmitting, to the second device, a first sidelink control information (SCI) including information related to resources; and transmitting information for extending the active time of a second UE to the second UE through a first physical sidelink control channel (PSCCH) or a first physical sidelink shared channel (PSSCH) related to the first PSCCH, based on that a gap between packet delay budget (PDB) and a next resource indicated by the first SCI being less than or equal to a first level.

12. The first device of claim 11, wherein the information for extending the active time of the second device is transmitted through a medium access control (MAC) control element (CE) or radio resource control (RRC) signaling or SCI.

13. The first device of claim 11, wherein the operations further comprise:

transmitting second SCI for scheduling a second PSSCH and third SCI to the second device through a second PSCCH, based on a first resource, wherein the second SCI includes information related to a second resource and information for allowing the second device to perform an SL DRX operation based on resource information between a time domain of the first resource and a time domain of the second resource.

14. A processing device comprising:

at least one transceiver;

at least one processor; and at least one memory connected to the at least one processor and storing instructions that, based on being executed, cause a first device to perform operations comprising:

obtaining a sidelink (SL) discontinuous reception (DRX) configuration including information related to an active time of a second device;

starting resource selection in a first slot;

determining a selection window, based on the first slot;

transmitting, to the second device, a first sidelink control information (SCI) including information related to resources; and transmitting information for extending the active time of a second UE to the second UE through a first physical sidelink control channel (PSCCH) or a first physical sidelink shared channel (PSSCH) related to the first PSCCH, based on a gap between packet delay budget (PDB) and a next resource indicated by the first SCI being less than or equal to a first level.

\*  \*  \*  \*  \*